US009594867B2

(12) United States Patent
Yu et al.

(10) Patent No.: US 9,594,867 B2
(45) Date of Patent: Mar. 14, 2017

(54) DRC-BASED HOTSPOT DETECTION CONSIDERING EDGE TOLERANCE AND INCOMPLETE SPECIFICATION

(71) Applicant: Synopsys, Inc., Mountain View, CA (US)

(72) Inventors: Yen Ting Yu, New Taipei (TW); Hui-Ru Jiang, New Taipei (TW); Yumin Zhang, Sunnyvale, CA (US); Charles C. Chiang, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 100 days.

(21) Appl. No.: 14/528,213

(22) Filed: Oct. 30, 2014

(65) Prior Publication Data

US 2016/0125120 A1 May 5, 2016

(51) Int. Cl.
*G06F 17/50* (2006.01)
*H01L 21/027* (2006.01)

(52) U.S. Cl.
CPC ........ *G06F 17/5081* (2013.01); *H01L 21/027* (2013.01); *G06F 2217/12* (2013.01)

(58) Field of Classification Search
CPC . G06F 17/5081; G06F 2217/12; H01L 21/027
USPC ................. 716/52, 54, 55, 56, 112; 703/15
See application file for complete search history.

(56) References Cited

U.S. PATENT DOCUMENTS

| | | | |
|---|---|---|---|
| 7,276,435 B1 * | 10/2007 | Pozder | H01L 21/76838 438/597 |
| 7,818,707 B1 | 10/2010 | Gennari et al. | |
| 8,601,419 B1 * | 12/2013 | Chiang | G06F 17/5081 716/112 |
| 8,799,830 B2 | 8/2014 | Robles | |

(Continued)

OTHER PUBLICATIONS

Jingyu Xu et al., IEEE 2007 Publication 1-4244-1382-6/07 entitled "Accurate Detection for Process-Hotspots with Vias and Incomplete Specification", pp. 839-846 (8 pages), 2007.

(Continued)

*Primary Examiner* — Phallaka Kik
(74) *Attorney, Agent, or Firm* — Bever, Hoffman & Harms, LLP

(57) ABSTRACT

A range-pattern-matching-type DRC-based process hotspot detection is provided that considers edge tolerances and incomplete specification ("don't care") regions in foundry-provided hotspot patterns. First, all possible topological patterns are enumerated for the foundry-provided hotspot pattern. Next, critical topological features are extracted from each pattern topology and converted to critical design rules using Modified Transitive Closure Graphs (MTCGs). Third, the extracted critical design rules are arranged in an order that facilitates searching space reduction techniques, and then the DRC process is sequentially repeated on a user's entire layout pattern for each critical design rule in a first group, then searching space reduction is performed to generate a reduced layout pattern, and then DRC process is performed for all remaining critical design rules using the (Continued)

reduced layout pattern. Candidate locations are then identified using the DRC results, and then the true hotspot locations are confirmed using longest common subsequence and linear scan techniques.

23 Claims, 18 Drawing Sheets

(56) References Cited

U.S. PATENT DOCUMENTS

| | | | |
|---|---|---|---|
| 8,839,171 B1* | 9/2014 | Varadarajan | G06F 17/5045 716/113 |
| 2004/0216072 A1* | 10/2004 | Alpert | G06F 17/5077 716/114 |
| 2005/0177811 A1 | 8/2005 | Kotani et al. | |
| 2006/0036977 A1 | 2/2006 | Cohn et al. | |
| 2006/0090146 A1 | 4/2006 | LeBritton et al. | |
| 2007/0240086 A1 | 10/2007 | Sinha et al. | |
| 2008/0046846 A1* | 2/2008 | Chew | G06F 17/5068 716/51 |
| 2008/0072182 A1* | 3/2008 | He | G06F 17/504 716/113 |
| 2008/0134103 A1* | 6/2008 | Zhao | G06F 17/5036 716/112 |
| 2008/0244497 A1* | 10/2008 | Zhao | G06F 17/5036 716/130 |
| 2010/0185994 A1 | 7/2010 | Pikus et al. | |
| 2012/0096417 A1* | 4/2012 | Durbha | G06F 17/5045 716/103 |

OTHER PUBLICATIONS

H. Yao et al., ICCAD 2006, Nov. 5-9, 2006, entitled "Efficient Process-Hotspot Detection Using Range Pattern Matching", pp. 625-632 (8 pages).

Ding et al. "High Performance Lithographic Hotspot Detection using Hierarchically Refined Machine Learning", 16th Asia and South Pacific Design Automation Conference (ASP-DAC), Jan. 25-28, 2011, pp. 775-780.

Ding et al. "Machine Learning based Lithographic Hotspot Detection with Critical-Feature Extraction and Classification", IEEE Conference on IC Design and Technology (ICICDT), May 18-20, 2009, pp. 219-222.

Kahng et al. "Fast Dual Graph Based Hotspot Detection", Photomask Technology 2006, Patrick M. Martin and Robert J. Nader, ed., Proc. of SPIE, vol. 6349, 6349H (2006).

Lin et al. "TCG: A Transitive Closure Graph-Based Representation for Non-Slicing Floorplans", DAC 2001, Las Vegas, Nevada, USA, Jun. 18-22, 2001, pp. 764-769.

Wuu et al. "Rapid Layout Pattern Classification", 16th Asia and South Pacific Design Automation Conference (ASP-DAC), Jan. 25-28, 2011, pp. 781-786.

Yu et al., "Accurate Process-Hotspot Detection Using Critical Design Rule Extraction", DAC 2012, Jun. 3-7, 2012, San Francisco, CA, USA, copyright 2012, pp. 1163-1168.

* cited by examiner

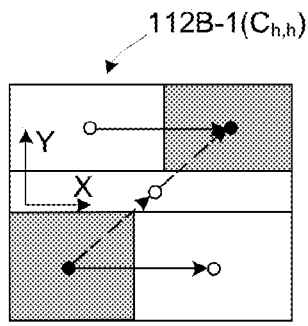
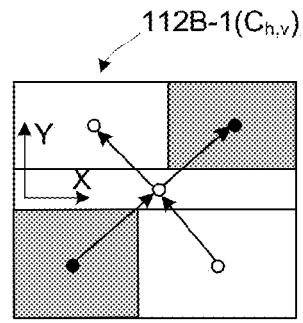
FIG. 7(A)  FIG. 7(B)
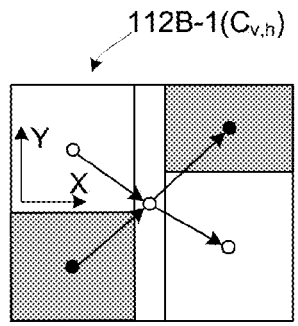
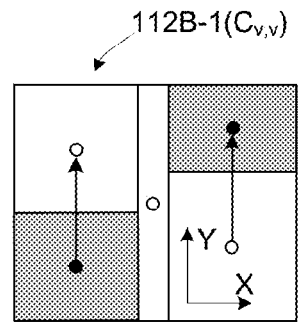
FIG. 7(C)  FIG. 7(D)
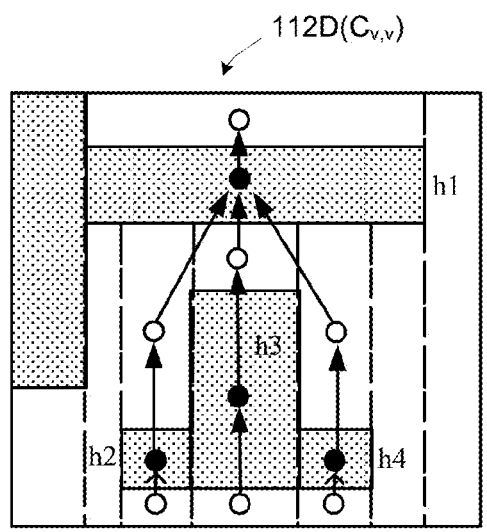
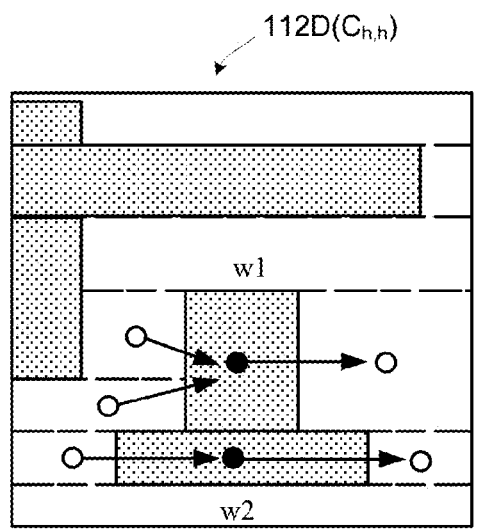
FIG. 8(A)  FIG. 8(B)

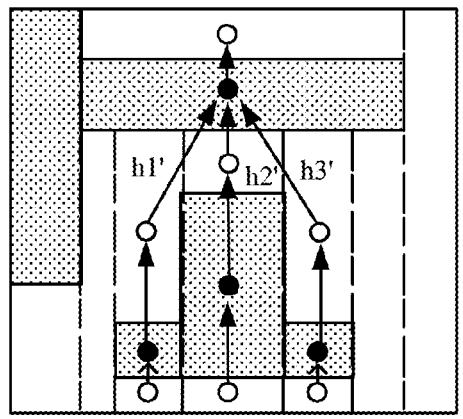 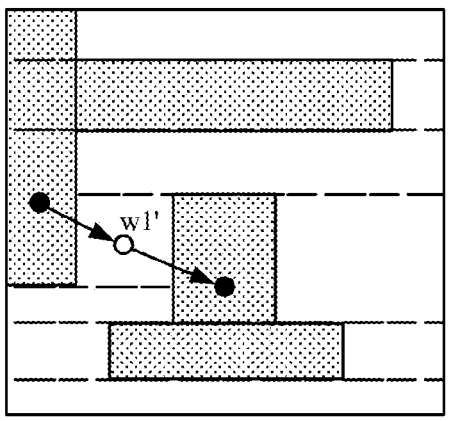
FIG. 9(A)  FIG. 9(B)
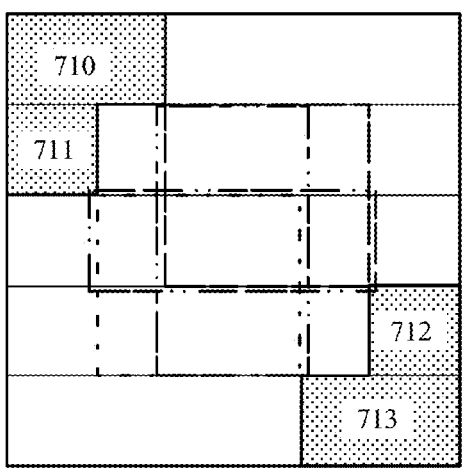 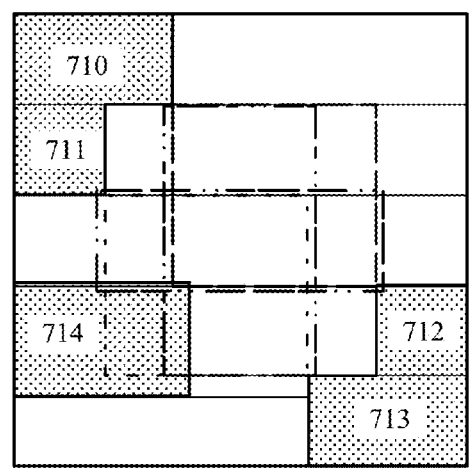
FIG. 10(A)  FIG. 10(B)

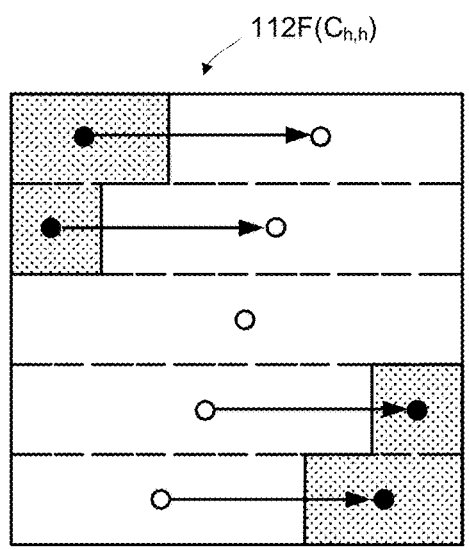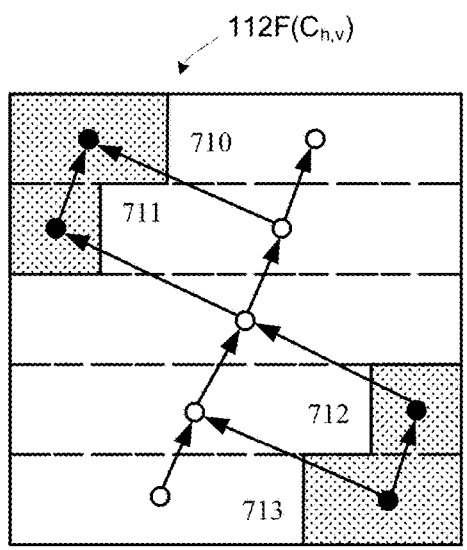
FIG. 10(C)　　　　　　FIG. 10(D)
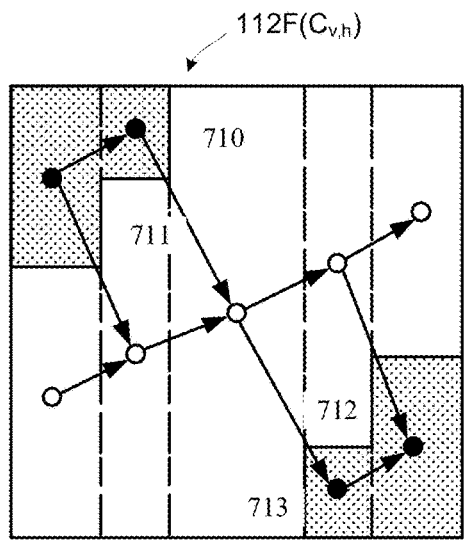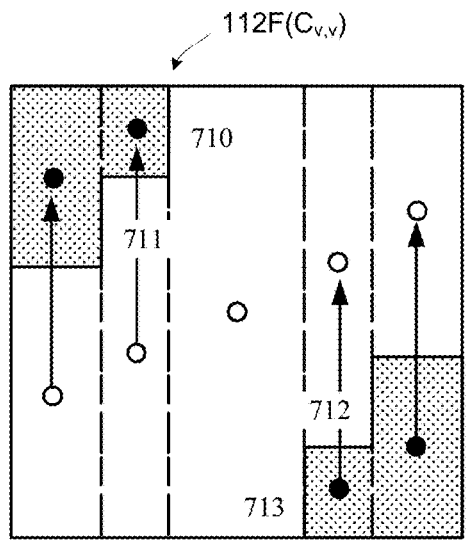
FIG. 10(E)　　　　　　FIG. 10(F)

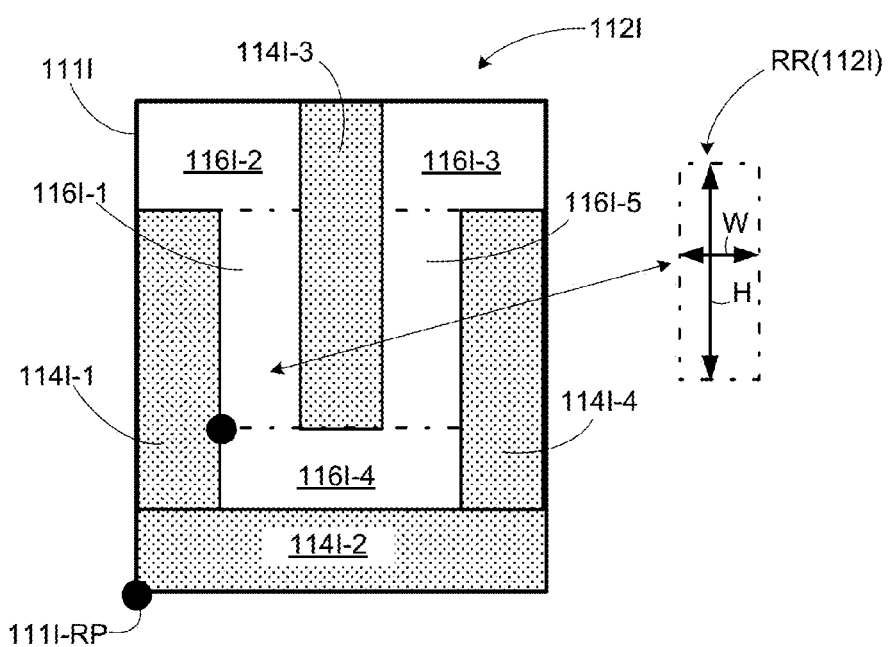
FIG. 15(A)
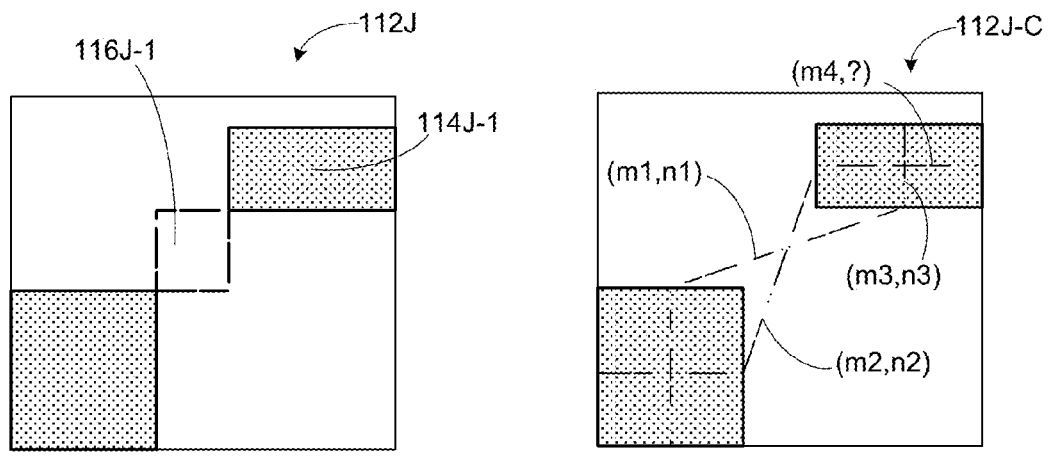
FIG. 15(B)
FIG. 15(C)

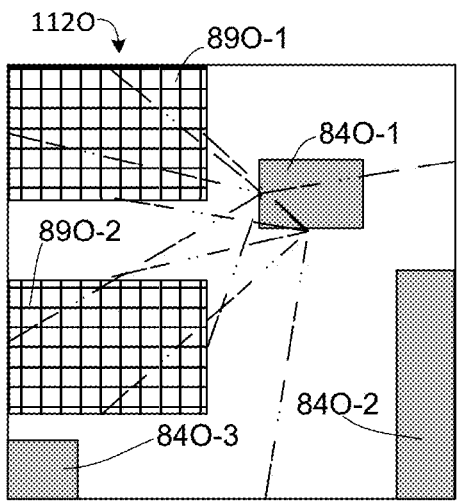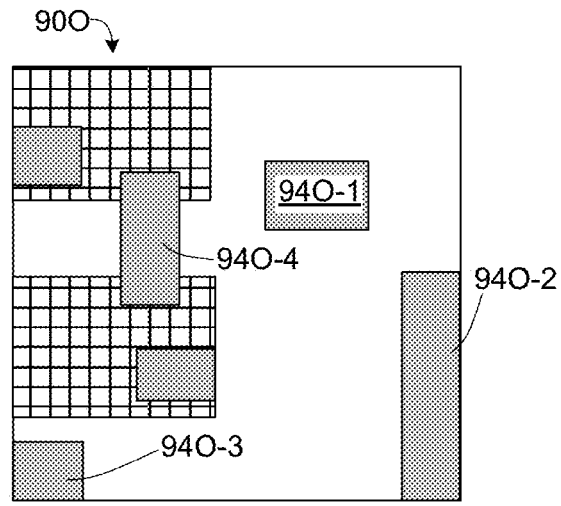
FIG. 25(A)  FIG. 25(B)
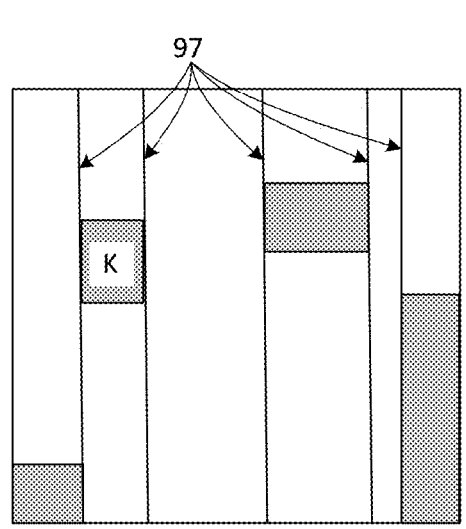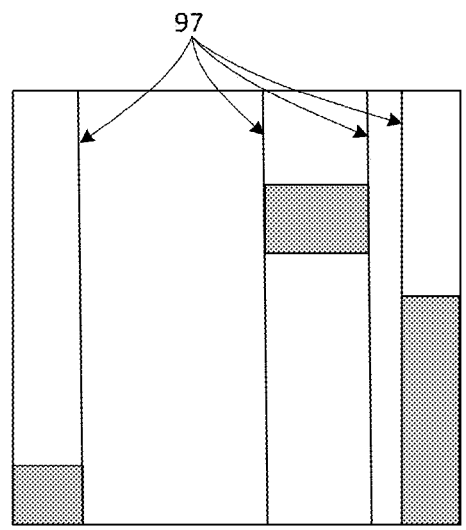
FIG. 26(A)  FIG. 26(B)

DRC-BASED HOTSPOT DETECTION CONSIDERING EDGE TOLERANCE AND INCOMPLETE SPECIFICATION

BACKGROUND OF THE DISCLOSURE

The disclosure relates to hotspot detection and in particular to an accurate process hotspot detection method for hotspot patterns having edge tolerances and incomplete specifications (i.e., don't care regions).

RELATED ART

In designing an integrated circuit (IC), engineers typically rely upon computer simulation tools to help create a circuit schematic design consisting of individual devices coupled together to perform a certain function. To actually fabricate this circuit in a semiconductor substrate, the circuit is translated into a series of layout patterns (i.e., two-dimensional patterns representing physical features of the various layers needed to form the physical circuit), the layout patterns are used to form a series of masks (aka, reticles; clear substrates on which the layout patterns is replicated in the form of light-blocking material), and then the masks are used in a fabrication process flow to form corresponding structures in and on the silicon surface. Again, computer aided design (CAD) tools assist layout designers in the task of translating the discrete circuit elements into polygons that collectively form the layout pattern, and embody the individual components of the IC, such as gate electrodes, field oxidation regions, diffusion regions, metal interconnections, and so on.

Once the layout of the circuit has been created, the next step to manufacture the IC is to transfer the layout onto a semiconductor substrate. One way to do this is to use the process of optical lithography in which the layout is first transferred onto a physical template which is in turn used to optically project the layout onto a silicon wafer.

In transferring the layout to a physical template, a mask (e.g. a quartz plate coated with chrome) is generally created for each layer of the integrated circuit design. This is done by inputting the data representing the layout pattern for each process layer into a device such as an electron beam machine, which writes the IC layout pattern into the mask material. In less complicated and dense integrated circuits, each mask comprises the geometric shapes (polygons) which represent the desired circuit pattern for its corresponding layer. In more complicated and dense circuits in which the size of the circuit features approach the optical limits of the lithography process, the masks may also comprise optical proximity correction features such as serifs, hammerheads, bias and assist bars which are designed to compensate for proximity effects. In other advanced circuit designs, phase shifting masks may be used to circumvent certain basic optical limitations of the process by enhancing the contrast of the optical lithography process.

These masks are then used to optically project the layout patterns onto a silicon wafer coated with photoresist material. For each layer of the design, a light is shone on the mask corresponding to that layer via a visible light source or an ultra-violet light source. This light passes through the clear regions of the mask, whose image exposes the underlying photoresist layer, and is blocked by the opaque regions of the mask, leaving that underlying portion of the photoresist layer unexposed. The exposed photoresist layer is then developed, typically, through chemical removal of the exposed/non-exposed regions of the photoresist layer. The end result is a semiconductor wafer coated with a photoresist layer exhibiting a desired pattern which defines the geometries, features, lines and shapes of that layer. This process is then repeated for each layer of the design.

Optical proximity correction (OPC) applies systematic changes to geometries of the layout to improve the printability of a wafer pattern. Specifically, as the size of integrated circuit features drops to $0.18\mu$ and below, the features can become smaller than the wavelength of the light used to create such features, thereby creating lithographic distortions when printing the features onto the wafer. These lithographic distortions can represent significant impacts on device performance.

Rule-based OPC can include rules to implement certain changes to a layout pattern, thereby compensating for some lithographic distortions. For example, to compensate for line-end shortening, rule-based OPC may add a hammerhead to a line end. To compensate for corner rounding, rule-based OPC can add (or subtract) serif shapes from outer (or inner) corners. These changes can form features on the wafer that are closer to the original intended layout. Unfortunately, the more complex lithographic effects cannot be efficiently described by simple geometric rules.

In modern manufacturing processes, certain layout configurations are susceptible to stress, lithographic process fluctuations, etc. it is necessary to replace them with manufacturing-friendly configurations to improve total yields. These problematic layout configurations are referred to as process-hotspots. Patterns with similar layouts could become process-hotspots due to different resolution enhancement technology (RET) constraints. These patterns could merely differ on spacings of certain facing edges. Instead of representing the possible variations using numerous exact patterns, it is more succinct to represent these similar patterns by a representative pattern with edge tolerances and incomplete specified regions. An edge tolerance describes the allowable distance variations between two facing edges of a polygon or from two different polygons, while an incompletely specified region means a don't care region in a hotspot pattern. A hotspot pattern with edge tolerances and incomplete specified regions can accurately and generally represent a true process-hotspot. Describing hotspot patterns using don't care regions facilitates capturing more hotspots in a layout. Any configuration of polygons can exist in a don't care region without changing the fact that a pattern is a process-hotspot or not.

Recently, extensive research endeavors have been devoted to process-hotspot detection, as known as pattern matching. These approaches can be classified into three categories exact pattern matching, fuzzy pattern matching and range pattern matching.

Exact pattern matching extracts only hotspots in a layout with exactly the same dimensions as a given hotspot pattern. In "Accurate process-hotspot detection using critical design rule extraction", Y.-T. Yu et al., Proc. DAC, pp. 1167-1172, 2012, Yu et al. devise modified transitive closure graphs (MTCG) to represent a given exact pattern and perform design rule checking (DRC) with only critical rules from this pattern. However, they cannot handle edge tolerances and incompletely specified regions in a given hotspot pattern.

Fuzzy pattern matching seeks the unseen hotspot patterns based on known hotspots. The topologies between detected hotspots and given hotspots may have huge differences. Kahng et al. present a pioneering work on fuzzy pattern matching in "Fast dual graph based hotspot detection" by A. B. Kahng et al., Proc. SPIE, vol. 6349, pp. 628-635, 2006. Kahng et al. create a dual graph to represent a given layout and then filter out over-weighted edges and faces according to a user-specified Threshold value. Later, Ding et al. in "Machine learning based lithographic hotspot detection with critical feature extraction and classification", Proc. ICICDT, pp. 219-222, 2009, Ding et al. in "High performance lithographic hotspot detection using hierarchically refined machine learning", Proc. ASP-DAC, pp. 775-780, 2011, Wuu et al. in "Rapid layout pattern classification", Proc. ASP-DAC, pp. 781-786, 2011, and Yu et al. in "Machine-learning-based hotspot detection using topological classification and critical feature extraction", In Proc. DAC, 67, 2013, propose variant machine learning frameworks based on artificial neural networks or support vector machines. They extract hotspot features to train their learning machines. However, this approach may suffer from long training time and/or false alarms. In addition, some of the identified hotspots are over-estimated.

Range pattern matching focuses on hotspots with identical or similar topologies to a given pattern. In United States Pub. Pat. App. No. 2010/0185933 A1, Jul. 13, 2010, Pikus and Collins extract all relations of polygon edges and distances between adjacent polygons inside a given pattern as the topological features. They then apply a graph search mechanism to identify hotspots based on DRC results. This approach may extract too many redundant rules thus increasing their matching time. U.S. Pat. No. 7,818,707 (Gennari et al.) describes two dimensional image-based DRC and hashing to improve DRC-based hotspot detection. They use a hash table to store the location and the layout configuration around each edge or corner in a layout. They determine hotspots by computing match factors between the pattern and layout. A sophisticatedly designed hash function is required to prevent hash collisions.

Existing range pattern matching methods, however, cannot be easily extended to handle variant topologies induced by foundry-provided hotspot patterns having edge tolerances and incompletely specified (don't care) regions. In "Efficient process-hotspot detection using range pattern matching", Proc. ICCAD, pp. 625-632, 2006, and "Accurate detection for process-hotspots with vias and incomplete specification", Proc. ICCAD, pp. 89-846, 2007, Yao et al. and Xu et al. respectively propose the state-of-the-art work to handle range pattern matching with don't care regions. They use window-sliding to investigate all possible windows within a layout. Each pattern and layout window is encoded by strings. String matching is then applied to identify hotspots. One inherent weakness of the string-matching-based method is that the encoded strings of a pattern cannot cover all possible layout configurations of hotspots. For incomplete specification, it is difficult to enumerate all pattern configurations within a "don't care" region. Hence, the string-matching-based method considers only two cases for each don't care region, either one empty space or one polygon.

Therefore, a need arises for a commercially-viable process hotspot detection technique that overcomes the deficiencies of conventional approaches. More specifically, what is needed is a hotspot detection technique that can efficiently and accurately detect actual process hotspots in a layout pattern that violate a foundry-provided hotspot pattern including one or more edge tolerances and/or one or more incompletely specified regions.

SUMMARY OF THE EMBODIMENTS

The present invention is directed to a DRC-based process-hotspot detection methodology that efficiently and accurately detects actual process hotspots in a layout pattern by enumerating (identifying/generating) all possible pattern topologies having corresponding alternative block arrangements defined by a foundry-provided hotspot pattern including edge tolerances and/or incompletely specified regions, extracting at least one critical topographical features from each of the pattern topologies and converting the extracted features to critical design rules arranging (ordering) the critical design rules in a manner that facilitates searching space reduction techniques, and then performing DRC in two or more phases using the searching space reduction techniques to minimize processing time. Enumerating all possible pattern topologies provides accurate identification of all actual hotspot regions in a layout pattern, but increases the number of required DRC iterations. To speed-up the DRC process, a first group of critical design rules is identified that collectively represent all possible pattern topologies (i.e., at least one extracted rule from each enumerated pattern topology is included in the first group), and first phase DRC processing is performed on the entire initial layout pattern using each critical design rule of the first group. Subsequently, searching space reduction techniques are utilized to generate a reduced layout pattern that only includes regions that are identified during the first phase DRC processing as including possible hotspot regions. Second phase DRC processing is then performed using all remaining critical rules, but only on the reduced layout pattern. By combining pattern enumeration (which increases hotspot detection accuracy) with rule ordering and two-phase DRC processing (which minimizes DRC processing time), the present invention provides a DRC-based process-hotspot detection methodology that efficiently and accurately detects actual process hotspots in a layout pattern. Once DRC is completed, the methodology further includes identifying candidate hotspot regions from the DRC results, and then finalizing identification of actual (true) hotspot regions, which in one embodiment involves using longest common subsequence and linear scan to increase efficiency and accuracy. Based on experimental results, the above methodology achieved 100% success rates and 1.53× speed-ups over conventional approaches. The actual hotspot regions are then utilized to modify the initial layout pattern (e.g., using OPC techniques), the modified layout patterns are utilized to produce physical masks, and then the masks are utilized in a semiconductor fabrication process to fabricate the integrated circuit defined by the modified layout patterns. The present invention therefore reduces IC manufacturing costs by significantly decreasing the amount of time needed to convert an IC circuit schematic to a fabricated IC device, and by facilitating higher fabrication yields by way of efficiently and accurately identifying hotspot regions.

According to an embodiment, enumerating the pattern topologies includes slicing various structures of the hotspot pattern to form polygons (i.e., block tiles and space tiles), generating pattern sets for each edge pair defined by an edge tolerance, converting each pattern set into pattern subsets, and generating a corresponding pattern topology for each pattern subset. In a preferred embodiment, slicing hotspot pattern structures affected by an edge tolerance includes binding the affected edge to avoid generating incorrect topologies. In another embodiment, all possible pattern topologies generated by one or more edge constraints are identified using an All-Pair Min-Range Path (APMRP) algorithm. In yet another embodiment, a special "boundary tile" is included in each enumerated pattern topology for foundry-provided hotspot patterns that include don't care regions bounded by two facing block edges.

According to an embodiment of the present invention, critical design rules are extracted by determining positional relationships of the tiles in each enumerated pattern topology, applying extraction rules to identify critical features, and then generating critical design rules for each identified critical feature. This approach facilitates accurately identifying all candidate layout regions that satisfy an enumerated topology during DRC process using a minimum number of design rules, thus reducing DRC processing time. In one embodiment, determining positional relationships between the tiles includes utilizing directed edges and/or rule rectangles. In a presently preferred embodiment, determining positional relationships between the various block and space tiles involves generating a plurality of modified transitive closure graphs (MTCGs) for each enumerated pattern topology. In a practical embodiment, selecting critical features involves applying at least one of six different extraction rules to each pattern topology, where the six extraction rules include an internal (first) rule, an external rule (second) rule, a diagonal (third) rule, a longedge (fourth) rule, a segment (fifth) rule and a boundary tile (sixth) rule. Each extracted feature is then translated into a critical design rule using rule rectangles, which include size (height and width) values and position values within a pattern window.

According to an exemplary embodiment of the present invention, the extracted critical design rules are then ordered (re-arranged) for submission for sequential DRC processing based on a predetermined priority. In one embodiment, to speed-up DRC (i.e., to reduce DRC processing time), when rule rectangles having the same size/type/position appear in more than one pattern topology, a single critical design rule is assigned to the multiple rule rectangles (i.e., one "shared" design rule covers multiple pattern topologies). According to a first order priority strategy, priority of each critical design rule is based on the number of pattern topologies represented by that critical design rule (i.e., a critical design rule covering seven pattern topologies is given a higher priority than—i.e., is processed by the DRC tool before—a critical design rule covering six pattern topologies). According to an alternative order priority strategy, priority is assigned based on the extraction rule utilized to identify each of the critical design rules (e.g., critical design rules generated by the first through third extraction rules are given higher priority than those extracted by the fourth through sixth rules).

According to another embodiment, DRC is then performed on the entire layout pattern starting with the highest ranking critical design rule, and is repeated for each subsequently ranked critical design rule until at least one critical design rule from each topology pattern has been processed. To cover all eight possible orientations of each topology pattern, two runset files are generated in which each critical design rule is described using two representative orientations that are rotated 90° from each other. To generate an efficient reduced layout pattern after processing the first group of critical design rules, expanded pattern windows are generated for each critical design rule that take into account the various orientations of each rule rectangle within its pattern topology window, and then all layout structures that are not included inside at least one expanded pattern window after the first DRC processing phase are removed from the initial layout pattern.

According to another embodiment, the DRC results are analyzed to identify candidate hotspot regions, and then to verify that the candidate hotspot regions are actual hotspot regions. A pattern topology can be captured and the impact of don't care regions can be neglected by encoding only the pattern topology's rule rectangles to two strings, one in the vertical direction and the other in the horizontal direction. These strings are utilized to efficiently identify candidate hotspot regions by way of searching the DRC results for longest common subsequences matching any of the pattern topology strings. Finalization is then performed by analyzing the candidate hotspot regions using constraint graphs and removing all layout structures located in don't care regions.

A non-transitory, computer-readable medium storing computer-executable instructions for providing hotspot detection is also described. These instructions, when executed by a processor, cause the processor to execute the above-described process. A system comprising a processor configured to execute this process is also described. The system can further include an output device for generating matched locations indicating verified actual hotspots in the layout.

BRIEF DESCRIPTION OF THE DRAWINGS

FIGS. 7(A), 7(B), 7(C) and 7(D) illustrate how horizontal tiled MTCGs and vertical tiled MTCGs provide different information that, in combination, result in a full representation of a hotspot pattern;

FIGS. 8(A) and 8(B) illustrate a first extraction rule;

FIGS. 9(A) and 9(B) illustrate a second extraction rule;

FIGS. 10(A), 10(B), 10(C), 10(D), 10(E), 10(F), 10(G) and 10(H) illustrate a third "diagonal" extraction rule;

FIGS. 15(A), 15(B), 15(C) illustrate the generation of a rule rectangle for an exemplary pattern topology;

FIGS. 25(A) and 25(B) illustrate an exemplary pattern topology and related layout region including similar structures;

FIGS. 26(A) and 26(B) illustrate exemplary constraint graphs utilized during a finalization process to verify that potential hotspots are actual hotspots.

DETAILED DESCRIPTION OF THE DRAWINGS

Figure 1:
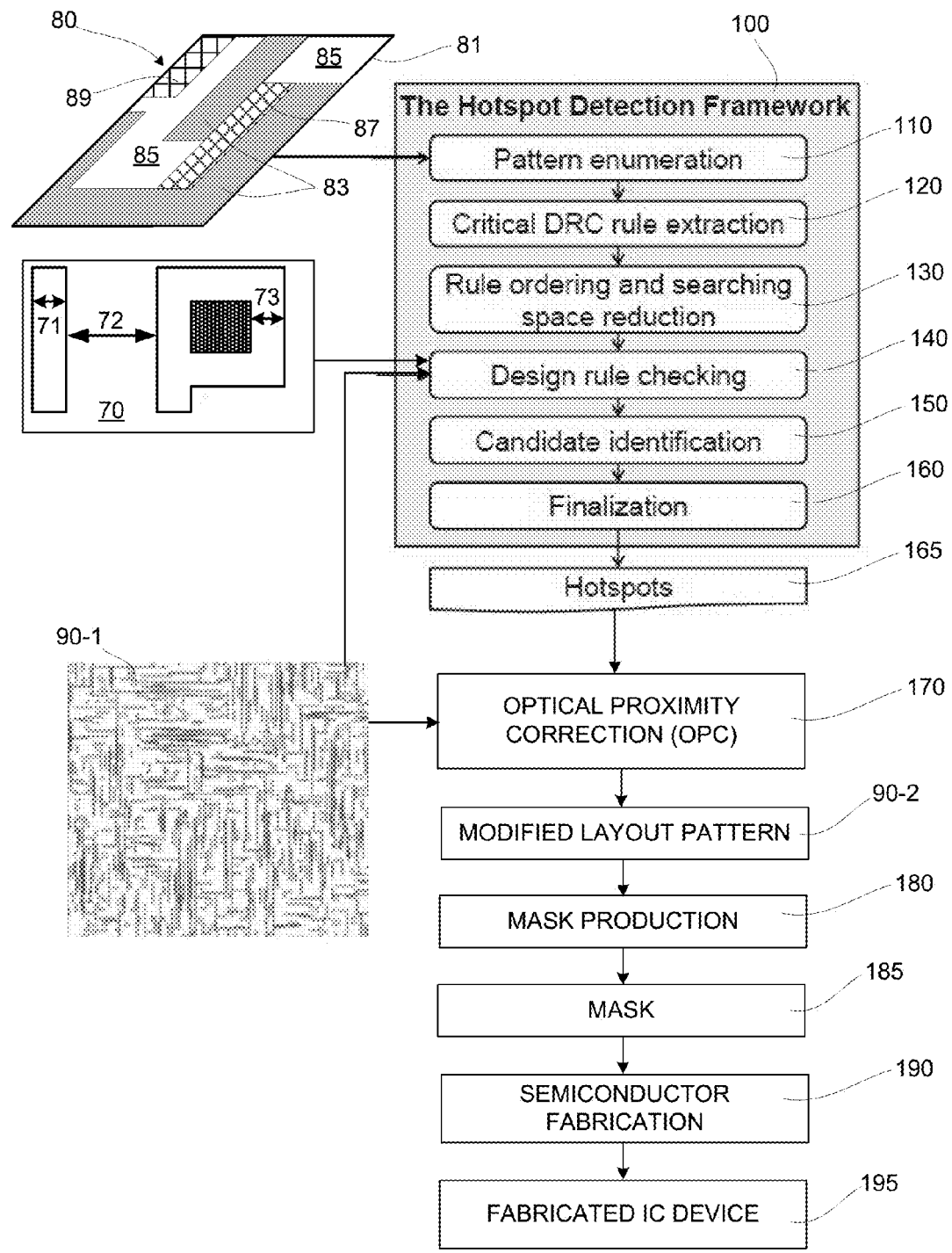
FIG. 1 is a flow diagram illustrating an integrated circuit fabrication process including the hotspot detection methodology of the present invention.

FIG. 1 is a simplified flow diagram indicating an integrated circuit fabrication process including a hotspot detection framework 100 that facilitates accurate and efficient DRC-based process-hotspot detection according to an embodiment of the present invention. Referring to the left side of FIG. 1, framework 100 receives as input foundry-provided fundamental design rules 70, at least one foundry provided hotspot pattern 80, and a user's initial layout pattern 90-1 (i.e., the layout pattern to be analyzed). Framework 100 generally includes a pattern enumeration process 110, a critical design rule checking (DRC) rule extraction process 120, and a rule ordering and searching space reduction process 130 that function as described below to generate critical design rules corresponding to hotspot pattern 80. These critical design rules are supplied to a DRC tool (140) that performs a DRC process according to the details provided below. The DRC results are then analyzed (block 150) to identify candidate (i.e., possible) hotspot regions in layout pattern 90, and then actual hotspot regions detected in layout pattern 90-1 are identified during a finalization process (block 160). Framework 100 outputs detected actual hotspot data (block 165) that can be utilized by a suitable layout correction program (e.g., an optical proximity correction (OPC) tool, block 170) to modify initial layout pattern 90-1, thereby generating a modified (corrected) layout pattern 90-2. As indicated in block 180, modified layout pattern 90-2 is then utilized to produce a physical mask 185, and then mask 185 is utilized in a semiconductor fabrication process (block 190) to fabricate an integrated circuit 195 including structures defined by modified layout pattern 90-2.

Before describing framework 100 and other novel aspects of the present invention in detail, various core concepts are explained below.

Referring to the left side of FIG. 1, block 70 illustrates in graphic form three fundamental design rules typically utilized during DRC. Fundamental design rules are sets of parameters used to guarantee the manufacturability of a layout. For a specific manufacturing process, foundries provide the corresponding set of fundamental design rules to ensure sufficient margins to compensate for variability during manufacturing. If an IC is fabricated using a layout pattern that violates these rules, the fabricated IC may not operate correctly. Referring to block 70, for a single layer, a width rule specifies the minimum width 71 of any polygon in the layout, while a spacing rule specifies the minimum distance 72 between two neighboring polygons. For two layers, an enclosure rule specifies a polygon should be covered with some additional margin 73 by some polygon on the other layer. These design rules can be expressed by equations and/or inequalities. For example, the minimum spacing rule can be described as the spacing between any two adjacent polygon edges is smaller than the spacing 72. These rules are applied during DRC, for example, by checking the widths and spacing of each block structure of user's layout pattern 90-1, and reporting the location of each block structure whose width is less than minimum width 71, and each pair of block structures whose edge-to-edge spacing is less than minimum distance 72. In addition to the three fundamental rules, modern DRC tools can perform general dimensional checks within a single polygon (including length, width, area, overlap, ratio, and density calculations) or between polygon edges (including intersecting polygon spacings, enclosure spacings, and external polygon spacings). Given a runset file (i.e., the design rules provided to the DRC tool to be checked during a DRC session) and a layout, a DRC tool reports each location that a rule is violated.

An exemplary hotspot pattern 80 is graphically depicted in the upper left portion of FIG. 1. The phrase "hotspot pattern" is used by the DRC industry to describe a pattern provided by a foundry, and the phrases "hotspot location" and "hotspot region" are used to describe the location of actual layout structures in a layout pattern that match a hotspot pattern. Consistent with most hotspot pattern descriptions, hotspot pattern 80 includes opaque "block" portions 83 and transparent "space" portions 85 that are disposed within a window boundary 81. According to an aspect of the invention, hotspot pattern 80 also includes an edge tolerance 87 disposed between two block portion edges, and an incomplete specification ("don't care") region 89, which are utilized to generally represent alternative hotspot pattern arrangements. As used herein, "edge tolerance" means a user-defined distance range between two facing edges of a polygon (block portion), or from two different polygons, and "don't care regions" are rectangular regions where any patterns with unknown/arbitrary shapes can exist. Moreover, a don't care region also has a certain range of edge tolerance. With these definitions, a hotspot location means an actual layout portion within the layout pattern having a configuration that matches the foundry-provided pattern inside window boundary 81. Note that there are eight possible orientations of each hotspot pattern that must be checked for, including combinations of four rotations and two mirrors.

Figure 2:
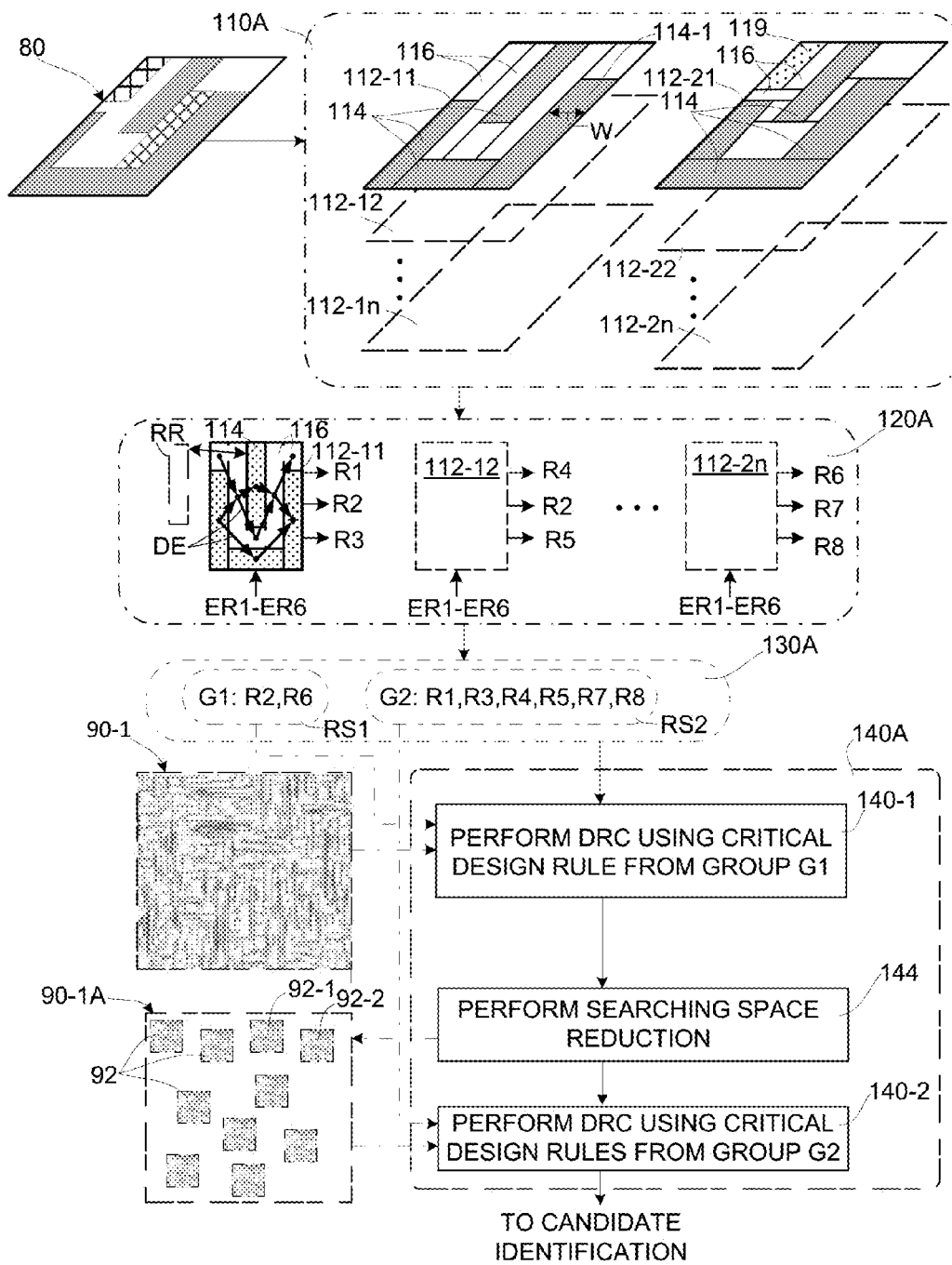
FIG. 2 is a flow diagram illustrating portions of the hotspot detection methodology of FIG. 1 in additional detail.

FIG. 2 is a modified diagram depicting a portion of framework 100 including important elements of the present invention according to a practical embodiment. Specifically, FIG. 2 depicts pattern enumeration (block 110A), critical rule extraction (block 120A), rule ordering (block 130A), and then performing DRC utilizing a searching space reduction strategy (block 140A). Referring to block 110A at the top of FIG. 2, hotspot pattern 80 is "enumerated" by way of generating multiple pattern topologies 112-11 to 112-1*n* and 112-21 to 112-2*n* based on corresponding alternative arrangements of hotspot pattern 80, where each pattern topology (e.g., 112-11 includes multiple polygon "tiles" (i.e., multiple block tiles 113 and multiple space tiles 116) disposed in a unique pattern arrangement (e.g., pattern topology 112-11 is different from all other pattern topologies 112-12 to 112-1*n* and 112-21 to 112-2*n*). Rule extraction (block 120A) involves identifying critical features of each of the enumerated patter topologies 112-11 to 112-1*n* and 112-21 to 112-2*n*, and generating critical design rules such that each pattern topology is represented by at least one said critical design rule (e.g., topology 112-11 is represented by critical design rules R1 to R2, pattern topology 112-12 is represented by critical design rules R2, R4 and R5, and pattern topology 112-2*n* is represented by critical design rules R6 to R8). Rule ordering (block 130A) includes, among other things, grouping extracted critical design rules (e.g., rules R1 to R8) into two or more rule groups (e.g., rule groups G1 and G2), where "primary" (first) rule group G1 includes at least one critical design rule from each of said plurality of pattern topologies, and the secondary rule groups (e.g., group G2) includes all remaining critical design rules. Assuming for the sake of example that pattern topologies 112-11, 112-12 and 112-2*n* (shown in block 120A) constitute the entire set of pattern topologies generated during enumeration, then design rules R2 and R6 satisfy the condition that at least one critical design rule from each pattern topology. Using this example, group G2 would include critical design rules R1, R3, R4, R5, R7 and R8, which constitute all remaining rules associated with pattern topologies 112-11, 112-12 and 112-2*n*. In one embodiment, a first DRC runset file RS1 is then generated including the critical design rules of group G1, and a second DRC runset file RS2 is then generated including the critical design rules of group G2. DRC (block 140A) is then performed in two phases: first phase DRC processing is performed to search the entirety initial layout pattern 90-1 using the critical design rules of group G1 (block 140-1), then searching space reduction is performed (block 144) during which a reduced layout pattern 90-1A is generated by modifying initial layout pattern 90-1 to include only regions 92 identified as satisfying at least one first critical design rule of group G1 during the first DRC processing phase, and then second phase DRC processing is performed (block 140-2) to search reduced layout pattern 90-1A for each of the critical design rules of group G2. The results of the two-phase DRC processing are then utilized to identify candidate hotspots (discussed below). Each of these features (i.e., enumeration, rule extraction, rule ordering and DRC processing) is described in additional detail in the following paragraphs.

Figure 3:
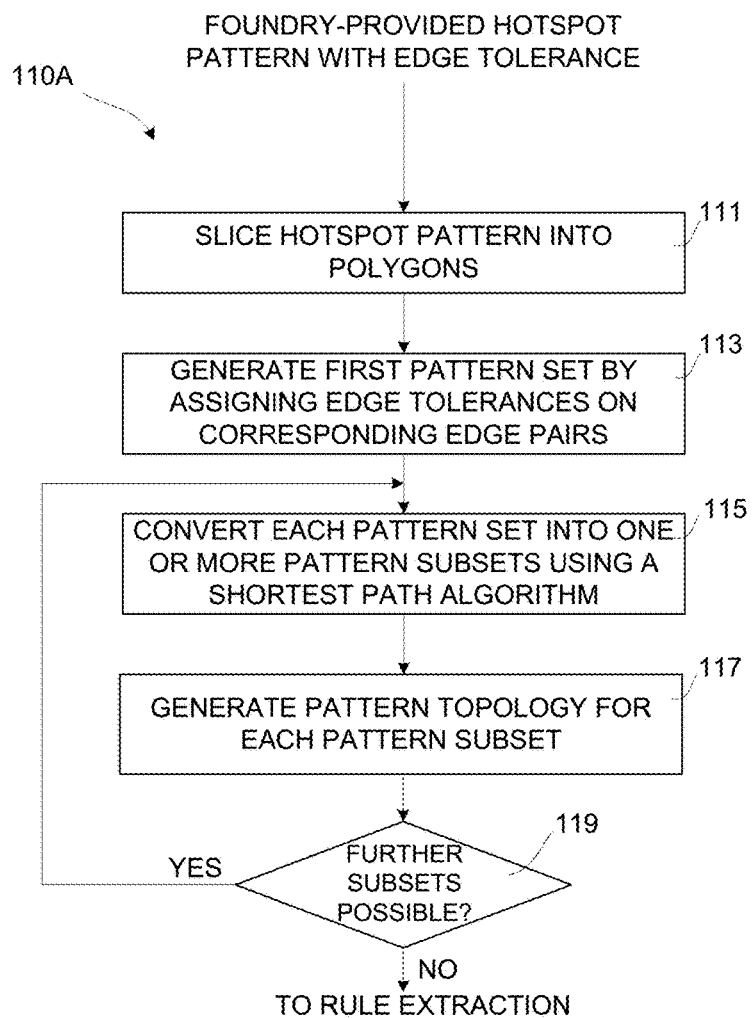
FIG. 3 is a flow diagram illustrating a pattern enumeration process of the hotspot detection methodology of FIG. 1 according to an embodiment of the present invention.

FIG. 3 is a flow diagram illustrating a pattern enumeration methodology for use with hotspot patterns including an edge tolerance according to an embodiment of the present invention. As understood in the art, edge tolerances within a foundry-provided hotspot pattern mean that various pattern topologies having structures that fit within the edge tolerances would qualify as actual hotspot regions (i.e., "satisfy" the foundry-provided hotspot pattern). To successfully detect all hotspot regions in a layout pattern using a hotspot pattern including one or more edge tolerances, it is first necessary to capture (i.e., identify) all possible pattern topologies that fit within the edge tolerances. As such, referring to the top of FIG. 3, the pattern enumeration methodology includes (block 111) slicing (dividing) the various structures of the hotspot pattern (e.g., block regions 83 and space regions 85 of hotspot pattern 80, FIG. 1) into polygons, (block 113) generating a pattern set for each pair of edges defined by an edge tolerance (e.g., edge tolerance 87), (block 115) converting each pattern set into pattern subsets, and (block 117) generating a corresponding pattern topology for each pattern subset. The existing pattern topologies are then analyzed to determine if they can be further divided in to additional subsets (block 119), and the process is then repeated until no more subsets can be generated.

Figures 4A, 4B, 4C, 4D:
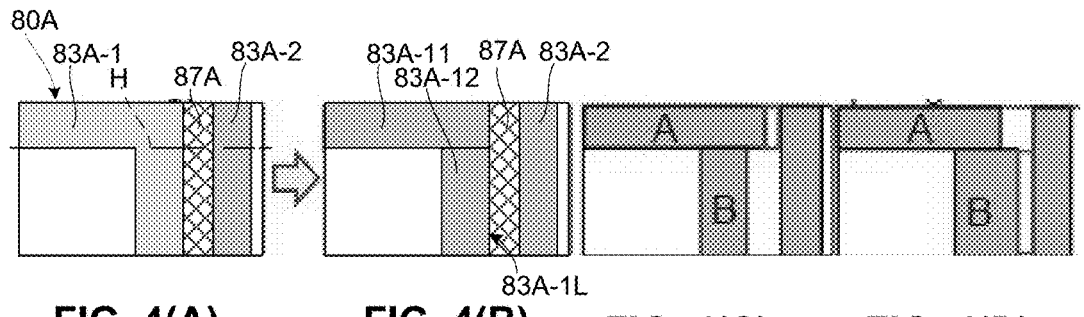
FIGS. 4(A), 4(B), 4(C) and 4(D) illustrate the importance of binding associated polygons along edges affected by edge tolerances.

Slicing each hotspot pattern (block 111) is performed in accordance with known techniques with the following exception. According to an embodiment of the invention, when slicing a structure a pattern structure affected by an edge tolerance 87A, the two or more resulting polygons generated by the slicing cut are bound along the edge affected by the edge tolerance. For example, FIG. 4(A) illustrates an exemplary hotspot pattern 80A including an "L" shaped pattern structure 83A-1 that is separated from a second pattern structure 83A-2 by an intervening edge tolerance 87A. During slicing, a horizontal cut line H slices "L" shaped pattern structure 83A-1 into two polygons, which are indicated in FIG. 4(B) as polygons 83A-11 and 83A-12. Because the left edge of "L" shaped pattern structure 83A-1 is affected by edge tolerance 87A, "spawned" polygons 83A-11 and 83A-12 are bound together (i.e., prevented from being misaligned in further enumeration processing) to avoid the generation of incorrect topologies, such as those shown in FIGS. 4(C) and 4(D), where the left edges of blocks A and B become misaligned.

According to another embodiment, the All-Pair Min-Range Path (APMRP) algorithm disclosed in "Efficient process-hotspot detection using rang pattern matching", Proc. ICCAD, pp. 625-632, 2006 (Yao et al.) is utilized to generate pattern subsets for each pattern set (block 115) in order to facilitate generating all possible pattern topologies in two dimensions. Current pattern sets are the APMRP results c previous pattern set. The terms pattern "set" and pattern "subset" are used to distinguish the pattern before and after APMRP algorithm in the same iteration. Let m and n denote the minimum and maximum distance between two vertical edges (or horizontal edges) of polygons within a given pattern. The APMRP algorithm is utilized to minimize the (n−m) value of all edge pairs in a given pattern. If m<0 and n>0, the (m, n) set contains three subsets: {(m, −1), (0, 0), (1, n)}. If m<0 and n=0, then there are two subsets: {(m, −1), (0, 0)}. If m=0 and n>0, there are two subsets: {(0, 0), (1, n)}. Otherwise, there is only one subset {(m, n)}. Each subset implies a designated pattern topology. Thus, for a given edge tolerance, the goal is to find all combinations of possible subsets from edge pairs.

After converting a (m, n) set to subsets, a corresponding pattern topology is generated for each pattern subset using known techniques (block 117). The pattern subsets are then analyzed to determine if any of the pattern subsets can be further divided into subsets (block 119), and, if so, the APMRP algorithm is repeated for these identified subsets. This process is recursively performed until no further subsets can be found, thus providing pattern topologies for all possible arrangements of a foundry-provided hotspot pattern including one or more edge tolerances.

Figure 5A:
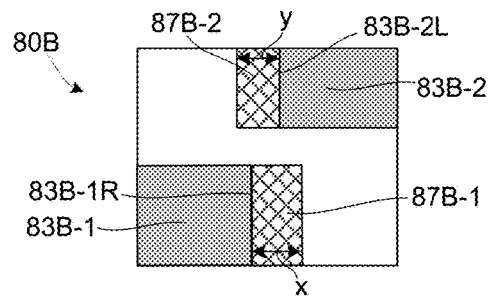
FIG. 5(A) shows an exemplary hotspot pattern with edge tolerances.

FIG. 5(A) shows an exemplary hotspot pattern 80B including pattern structures 83B-1 and 83B-2, each affected by corresponding edge tolerances 87B-1 and 87B-2 that allows edge 83B-1R of block 83B-1 to vary within range "x" and a edge 83B-2L of block 83B-2 to vary within range "y".

Figure 5B:
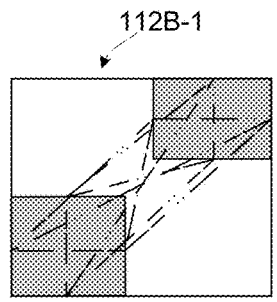
FIGS. 5(B), 5(C) and 5(D) illustrate various pattern topologies generated by the hotspot pattern of FIG. 5(A) according to an embodiment of the present invention.
Figure 5C:
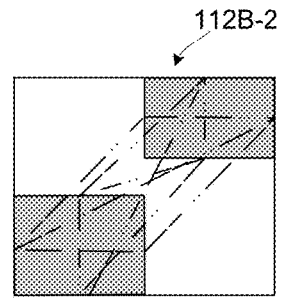
Figure 5D:
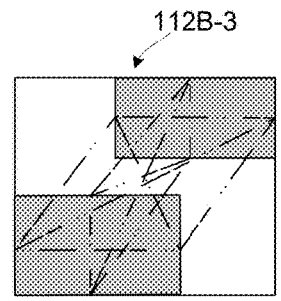

After APMRP, the (m, n) between edges 83B-1R and 83B-2L fit the condition where m<0 and n>0. Thus, three topologies 112B-1, 112B-2 and 112B-3, shown in FIGS. 5(B), 5(C) and 5(D), respectively, are generated with distance (m, −1), (0, 0) and (1, n) between edge edges 83B-1R and 83B-2L. No new subsets could be found from these three topologies after APMRP, thus topologies 112B-1, 112B-2 and 112B-3 are returned as enumeration results for hotspot pattern 80B. Without destroying any pattern topology, edge constraints (m, n) define the minimum and maximum distance among each edge pair. In FIGS. 5(B), 5(C) and 5(D), the corresponding constraint graphs for pattern topologies 112B-1, 112B-2 and 112B-3 are indicated by dashed-dot and dashed-double-dot lines. Dashed-dot lines indicate all of the horizontal edge constrains while dashed-double-dot lines indicate all of the vertical edge constrains.

Figure 6A:
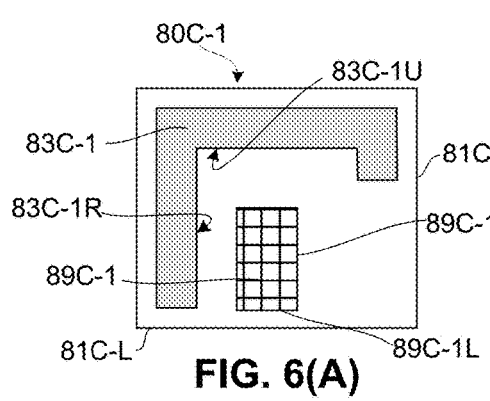
FIGS. 6(A) and 6(B) show exemplary hotspot patterns with two types of don't care regions.
Figure 6B:
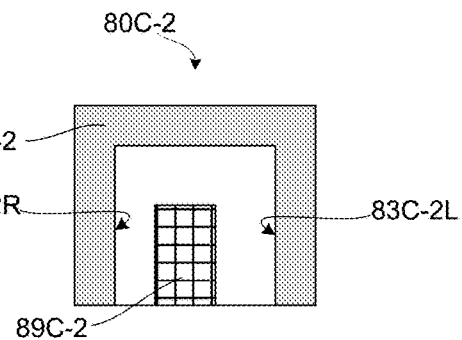
Figure 6C:
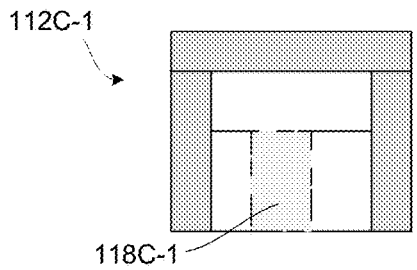
FIGS. 6(C) and 6(D) illustrate two pattern topologies generated by the hotspot pattern of FIG. 6(b) according to an embodiment of the present invention.
Figure 6D:
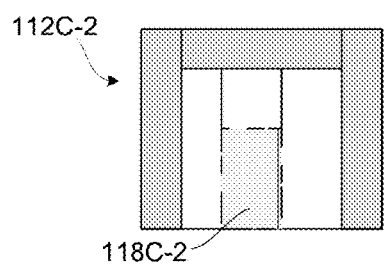

According to another embodiment, when a foundry-provided hotspot pattern includes one or more unspecified "don't care" regions, enumeration includes determining whether each "don't care" region is disposed between two block structure edges, and assigning a special boundary tile for each such "don't care" region. The goal is to generate pattern topologies that reflect the presence of don't care regions during DRC. In one embodiment, two types of don't care regions are considered: the first type includes don't care regions with two or three adjacent edges fully facing the window boundaries, and the second type includes don't region in between two facing structure edges. FIG. 6(A) illustrates an example of a hotspot pattern 80C-1 according to the first type, where don't care region 89C-1 is bounded only on one side by edge 83C-1R and 83C-1U of opaque structure 83C-1. FIG. 6(B) illustrates an example of a hotspot pattern 80C-2 according to the second type, where don't care region 89C-2 is bounded on two sides by edges 83C-2R and 83C-2L of opaque structure 83C-2. In one embodiment, don't care regions of the first type are discarded (i.e., all reference to the don't care region is omitted from the enumerated pattern topologies), and don't care regions of the second type are covered by adding a new tile referred to herein as a 'boundary tile' into the region of each pattern topology corresponding to the designated don't care region. FIGS. 6(C) and 6(D) depict two such pattern topologies 112-C1 and 112C-2 that include corresponding sliced tiles and boundary tiles 118C-1 and 118C-2. As set forth below, each boundary tile is interpreted during rule extraction as a special window boundary, and no rules are extracted for boundary tiles.

Referring again to FIG. 2, after enumeration is completed, the next phase of the framework involves critical design rule extraction (block 120A). To use the aid of DRC to realize hotspot detection, it is necessary to identify topological features (e.g., the location and size of each block tile and space tile) of the enumerated pattern topologies, and to convert these topological features into DRC design rules, which are then utilized by the DRC tool to identify the associated topology features. The conversion of topological features to DRC design rules is referred to as "design rule extraction". An intuitive way to extract design rules is to convert every tile edge constraint of each enumerated pattern topology to DRC design rules. However, this approach would generate a very large number of generalized (simple) DRC design rules that would significantly increase DRC processing time and would produce large numbers of false detections in the DRC results. It is therefore desirable to extract a minimum number of "critical" DRC design rules that accurately identify each enumerated pattern topology.

In accordance with an embodiment of the present invention, critical design rules (e.g., design rules R1, R2 and R3) are extracted by determining positional relationships between the various block tiles and space tiles in each enumerated pattern topology, applying a plurality of extraction rules to identify critical features defined by the determined positional relationships, and then generating a critical design rules for each of the identified critical features. This process is illustrated in an exemplary form in FIG. 2 (block 120A), which depicts determining positional relationships between the various block tiles 114 and space tiles 116 of pattern topology 112-11 using directed edges DE and optional rule rectangles RR. Next, extraction rules ER1 to ER6 are applied in the manner described below to identify critical features, and then the identified critical features are used to generate critical design rules (e.g., the critical features of topology 112-11 generate critical design rules R1, R2 and R3). Although not show in detail, similar processes are applied to each enumerated pattern topology (e.g., topologies 112-12 and 112-2*n*), whereby critical rules are generated for each pattern topology (e.g., critical design rules R4, R2 and R5 are generated from the determined critical features of pattern topology 112-12, and critical design rules R6, R7 and R8 are generated from the determined critical features of pattern topology 112-2*n*). Note that critical design rule R2 is generated for both pattern topologies 112-11 and 112-12, meaning that a critical feature of each of these topologies (e.g., the size and other characteristics of an internal block or space tile) is identical. As set forth below, the extracted critical design rules are then utilized both during DRC processing and after DRC processing to identify candidate hotspot regions.

Accord to a preferred embodiment, Modified Transitive Closure Graphs (MTCGs) are utilized in conjunction with novel extraction rules to generate critical design rules for pattern topologies enumerated from a foundry-provided hotspot pattern having edge tolerances and incomplete specifications. MTCGs are numerical representations of pattern topologies that can represent a unique tiled pattern, and can be characterized as an extension of transitive closure graphs (TCGs) representation proposed by Lin and Chang in "A transitive closure graph based representation for non-slicing floorplans", Proc. DAC, pp. 764-769, 2001. In the figures referenced below, each MTCG vertex is indicated by a dot or circle, and represents the central location of a block tile (dot) or a space tile (circle), while each edge (solid line) represents some topological relation among the tiles. Directed edges, which represent positional relations between adjacent tiles, and are indicated by lines with arrows extending between related vertices. Two sets of MTCGs are generated for each pattern topology in order to fully capture that topology: the first set is constructed from the horizontally tiled pattern, and the second set is constructed from the vertically tiled pattern. For example, FIGS. 7(A) to 7(D) depict MTCGs that are generated for pattern topology 112B-1 (described above with reference to 5(B)). FIGS. 7(A) and 7(B) show an exemplary "first" (horizontal) MTCG set for pattern topology 112B-1, where FIG. 7(A) shows horizontally tiled horizontal constraint graph 112B-1($C_{h,h}$), and FIG. 7(B) shows horizontally tiled vertical constraint graph 112B-1($C_{h,v}$). FIGS. 7(C) and 7(D) respectively show the "second" (vertical) MTCG set for pattern topology 112B-1, where FIG. 7(C) shows vertically tiled horizontal constraint graph 112B-1($C_{v,h}$), and FIG. 7(D) shows vertically tiled vertical constraint graph 112B-1($C_{v,v}$). In the $C_{v,v}$ or $C_{h,v}$ constraint graphs (e.g., shown in FIGS. 7(B) and 7(C), respectively), a directed edge is added between any two adjacent tiles if their projections on x-axis overlap. Similarly, in $C_{v,h}$ or $C_{h,h}$ constraint graphs (e.g., shown in FIGS. 7(A) and 7(D), respectively), a directed edge is added between any two adjacent tiles if their projections on y-axis overlap. Moreover, the diagonal relations among block (space) tiles can be extracted when two adjacent block (space) tiles do not overlap on x-axis and y-axis in the $C_{h,h}$ constraint graph (e.g., see the dashed-line arrows in FIG. 7(A)). Because spacing is considered, and the tiled pattern is compact, (redundant) transitive edges can be excluded during MTCG construction.

Constraint graphs generated by pattern enumeration, FIG. 5(B) to 5(D), actually contain all of the feature information needed to describe a given hotspot pattern. However, if all of the edge constraints (dash-lines and dashed-double-lines) are directly converted to DRC rules, then a large number of redundant rules will also be applied. Thus, the next task is selecting critical features from the generated MTCGs, and then translating the critical features into design rules (the dimensions of all features were stored in the constraint graphs after pattern enumeration). Because MTCGs are good representations, they facilitate critical feature selection. Note that critical features may be isolated polygons or surrounded by arbitrarily-shaped polygons. Both conditions can be addressed as described in detail below. In the disclosed embodiment described below, six different extraction rules are utilized to identify critical features, including an internal (first) rule, an external rule (second) rule, a diagonal (third) rule, a longedge (fourth) rule, a segment (fifth) rule and a boundary tile (sixth) rule, which are explained in detail below. In one embodiment, to save time, the first through sixth rules are applied only to the $C_{h,h}$ and $C_{v,v}$ constraint graphs of each MTCG, and the other two graphs serve for boundary checking. Each extracted feature is then translated into a critical design rule using known techniques.

The first (internal) extraction rule (i.e., rule ER1 in FIG. 2, block 120A) involves determining the width and height of a block tile that does not touch the window boundary. As shown in FIGS. 8(A) and 8(B), the dimension of each block tile not touching a window boundary can be determined using constraint graph $C_{v,v}$ in a vertical tiled MTCG constraint graph 112D($C_{v,v}$) (FIG. 8(A)) and constraint graph $C_{h,h}$ in a horizontal tiled MTCG constraint graph 112D($C_{h,h}$) (FIG. 8(B)). Applying the first extraction rule to constraint graph 112D($C_{v,v}$) facilitates determining heights h1, h2, h3, and h4, whereas applying the first extraction rule 112D($C_{h,h}$) facilitates determining widths w1 and w2. To exclude block tiles touching the window boundary, given an MTCG, only block vertices whose incoming and outgoing edges are connected to space vertices are extracted.

The second (external) extraction rule (i.e., rule ER2 in FIG. 2, block 120A) involves determining the distances between two adjacent block tiles. As shown in FIGS. 9(A) and 9(B), the dimensions of the space tiles not touching the window boundary and located in between block tiles can be determined using a constraint graph $C_{v,v}$ in a vertical tiled MTCG constraint graph 112D($C_{v,v}$) (FIG. 9(A)) and a constraint graph $C_{h,h}$ in a horizontal tiled constraint graph 112E($C_{h,h}$) (FIG. 9(B)). Applying the second extraction rule to constraint graph 112E($C_{v,v}$) facilitates determining heights h1', h2', and h3', whereas applying the first extraction rule 112E($C_{h,h}$) facilitates determining width w1'. Given an MTCG, any space vertex which lies in between exactly two block vertices can be extracted.

Figure 10G:
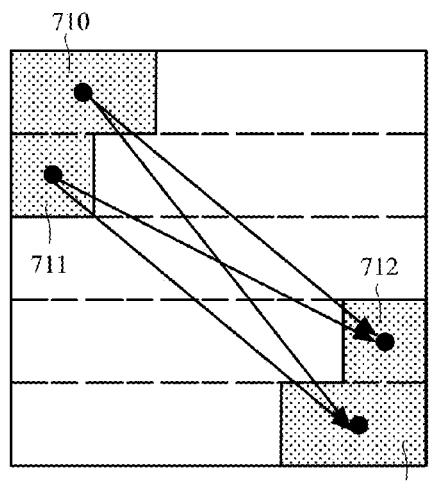

The third (diagonal) extraction rule (i.e., rule ER3 in FIG. 2, block 120A) involves determining the diagonal relations between two convex corners of block (space) tiles. Convex corners of tiles can be identified by using four rectangles to connect corners of the tiles, wherein no overlapping tiles (of the same type of tile) impinge on the four rectangles. For example, as shown in FIG. 10(A), four rectangles connect the corners of block tiles 710, 711, 712, and 713. Specifically, a first rectangle shown by a dashed line connects block tiles 710 and 712; a second rectangle shown by a dashed-dot line connects block tiles 710 and 713; a third rectangle shown by a dotted line connects block tiles 711 and 713; and a fourth rectangle shown by a dashed-double dot connects block tiles 711 and 712. Because no block tile impinges on the four rectangles, block tiles 710, 711, 712, and 713 can be characterized as convex corners. In contrast, FIG. 10(B) illustrates substantially the same polygons with the addition of block tile 714. Because block tile 714 impinges at least one of the four rectangles, block tiles 710, 711, 712, and 713 are not characterized as convex corners. Thus, the third critical DRC rule can be applied to FIG. 10(A), but not FIG. 10(B).

FIGS. 10(C) and 10(D) illustrate constraint graphs 112F($C_{h,h}$) and constraint graph 112F($C_{h,v}$), respectively. FIGS. 10(E) and 10(F) illustrate constraint graph 112F($C_{v,h}$) and constraint graph 112F($C_{v,v}$), respectively. In one embodiment, only in horizontal tiled horizontal constraint graph 112F($C_{h,h}$), a diagonal directed edge is added between any two adjacent block tiles (space tiles) if their projections on the y-axis do not overlap, wherein adjacency means there are no other block tiles (space tiles) in between the corner region formed by these two block tiles (space tiles).

In one embodiment, when convex corners are identified, four diagonal edges can be extracted. For example, referring to FIG. 10(G), the four diagonal edges include: a first diagonal edge between block tiles 710 and 712, a second diagonal edge between block tiles 710 and 713, a third diagonal edge between block tiles 711 and 712, and a fourth diagonal edge between block tiles 711 and 713. Note that FIG. 10(E) (vertical tiled constraint graph) facilitates determining the length of the diagonal edge between block tiles 710 and 713, whereas FIG. 10(D) (horizontal tiled constraint graph) facilitates determining the length of the diagonal edge between block tiles 711 and 712. The other two diagonal edges between the two convex corners can be imputed by using these lengths.

Figure 10H:
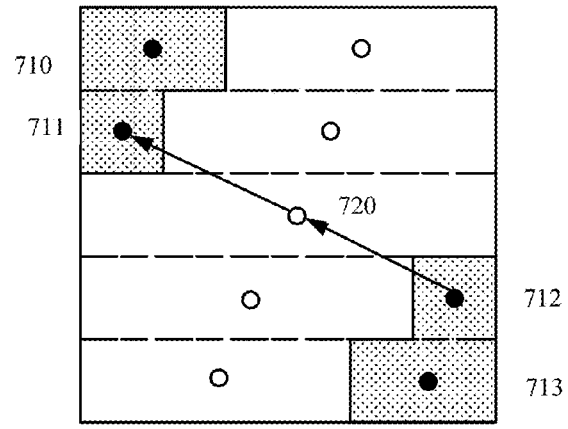

In another embodiment, a reduced diagonal relation among block tiles (space tiles) can be extracted when a space (block) vertex from vertical or horizontal constraint graphs with one incoming directed edge and one outgoing directed edge are connected to the same pair of block (space) vertices as a diagonal edge in the horizontal tiled constraint graphs of a given MTCG. Thus, for example using horizontal tiled constraint graph shown in FIG. 10(H) includes incoming and outgoing directed edges for a space vertex 720 between block tiles 711 and 712. Therefore, in this case, only the diagonal edge between block tiles 711 and 712 is extracted.

Figure 11A:
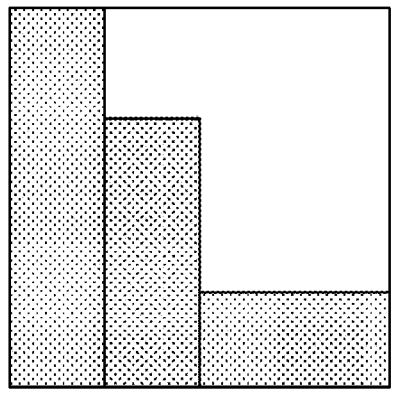
FIGS. 11(A), 11(B), 11(C) and 11(D) illustrate typical problem patterns.
Figure 11B:
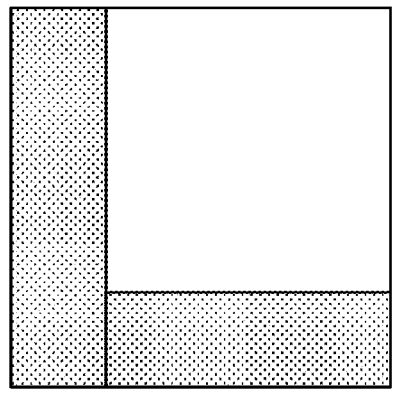
Figure 11C:
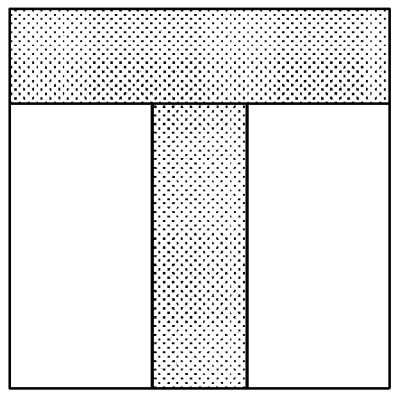
Figure 11D:
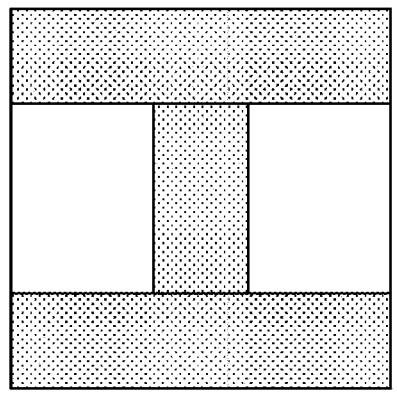

The primary rules, i.e. the first, second, and third critical DRC rules, can handle most basic hotspot patterns. However, the primary rules may be insufficient for some special cases. For example, the above-described primary rules do not apply to the following patterns: "stairs" (FIG. 11(A)), "L" (FIG. 11(B)), and "T" (FIG. 11(C)). Only one rule, i.e. the first rule, can be applied to a pattern "I" (FIG. 11(D)). Too few rules imply that too many redundant locations could be reported.

Because white spaces are considered, thereby making the tiled patterns compact, the transitive edges (i.e. redundant edges) can be simplified during MTCG construction. FIG.

Figure 10I:
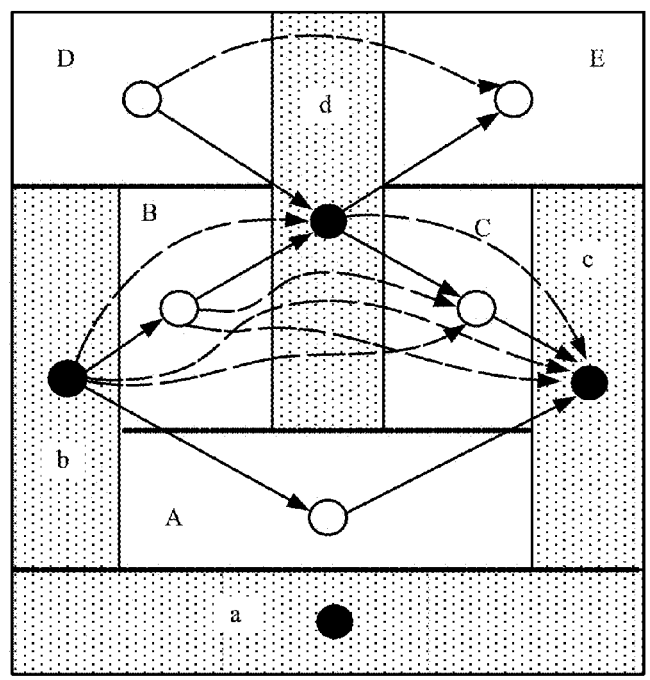
FIG. 10(I) illustrates a horizontal tiled constraint graph $C_h$ with both directed edges and transitive edges.

10(I) illustrates a horizontal tiled constraint graph with both directed edges (shown as solid lines with arrows) and transitive edges (shown as dashed lines with arrows). As indicated above, any tile projection overlapping with an adjacent tile in the y-axis generates a directed edge. Picking tile b as an example, the edge between tile b and tile d is said to be a transitive edge if there exists another path from tile b to tile d (e.g. path b→B→d). The edge between tile b to tile C is said to be a transitive edge if there exists another path from tile b to tile C (e.g. path b→B→d→C). The edge between tile b to tile c is said to be a transitive edge if there exists another path from tile b to tile c (e.g. path b→B→d→C→c or path b→A→c). Therefore, three transitive edges start from block tile b: b→c, b→d, and b→C. The total transitive edge list for FIG. 10(I) includes: b→c, b→d, b→C, d→c, B→c, B→C, and D→E. Without these transitive edges, MTCGs can be characterized as sparse representations.

To overcome this difficulty, two secondary rules, described below as the fourth and fifth critical DRC rules (i.e., rules ER4 and ER5 in FIG. 2, block 120A), can be added for tiles that touch the window boundary.

Figure 12A:
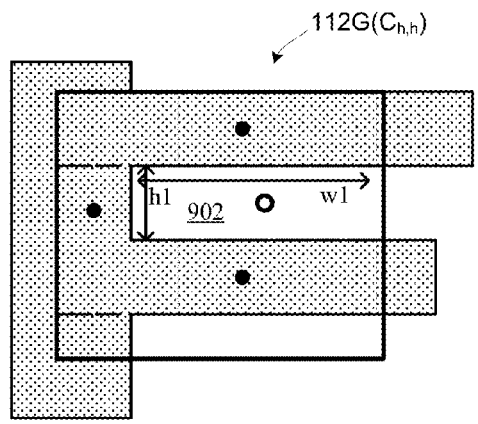
FIGS. 12(A) and 12(B) illustrate a fourth "longedge" extraction rule.
Figure 12B:
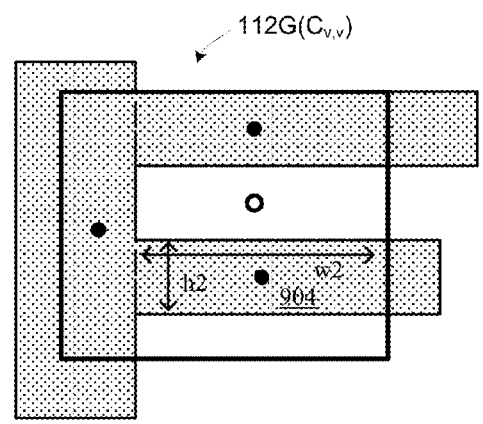

In the fourth (longedge) critical DRC rule, the space or block tile with one edge touching the window boundary can be identified and its dimensions determined (called a first boundary tile). Note that this "touching" includes an edge of the polygon ending at or crossing the window boundary. For example, FIG. 12(A) shows a horizontal tiled constraint graph 112G($C_{h,h}$) (directional edges not shown) that identifies a space tile 902, then determines its height h1 and width w1. FIG. 12(B) shows a vertical tiled constraint graph 112G($C_{v,v}$) (directional edges not shown) that identifies a block tile 904, then determines its height h2 and width w2. Thus, given an MTCG, the dimensions of a tile having a space vertex with zero in-degree or out-degree in constraint graph $C_{v,v}$ and non-zero incoming and outgoing edges connected to block vertices in a corresponding constraint graph $C_{h,h}$ can be extracted. Similarly, the dimensions of a tile having a space vertex with zero in-degree or out-degree in constraint graph $C_{h,h}$ and non-zero incoming and outgoing edges connected to block vertices in a corresponding constraint graph $C_{v,v}$ can be extracted. The dimensions of a tile having a block vertex can be similarly determined.

Figure 13A:
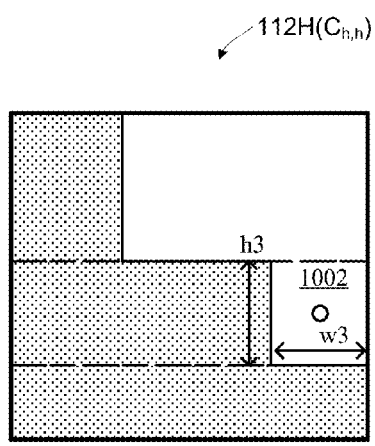
FIGS. 13(A) and 13(B) illustrate a fifth "segment" extraction rule.
Figure 13B:
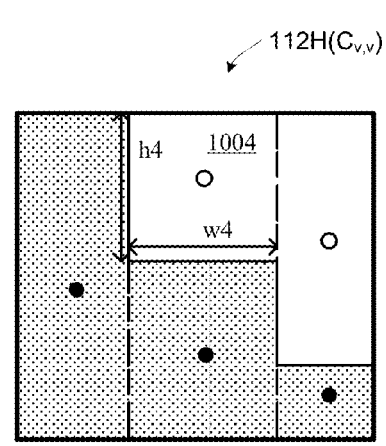

In the fifth (segment) critical DRC rule, a space tile with one edge touching the window boundary and another edge touching another space tile (called second boundary tiles) is identified and its dimensions determined. For example, FIG. 13(A) shows a horizontal tiled constraint graph 112H($C_{h,h}$) (directional edges not shown) that identifies a space block 1002, then determines its height h3 and width w3. FIG. 13(B) shows a vertical tiled constraint graph 112H($C_{h,h}$) (directional edges not shown) that identifies a space block 1004, then determines its height h4 and width w4. In this manner, the dimensions of the second boundary tiles can be extracted.

The secondary rules (i.e. the fourth and fifth critical DRC rules) can handle the cases that the primary rules cannot, e.g. the fourth critical DRC rule can handle "T" and "I", while the fifth critical DRC rule can handle "stairs" and "L". In one embodiment, because the fifth critical DRC rule is very general, thereby inducing many design rules, if the dimensions of the tiles can be extracted using first through fourth critical DRC rules, then the fifth critical DRC rule is not applied to the MTCGs to ensure fast processing.

In addition to the above five extraction rules, a sixth (don't care region) extraction rule (i.e., rule ER6 in FIG. 2, block 120A) provided for handling don't care regions (e.g., don't care region 89 of foundry-provided hotspot pattern 80, shown in FIG. 1). As discussed above with reference to FIGS. 6(A) to 6(D), two types of don't care regions are defined: the first type (e.g., "type 1" don't care region 89C-1, shown in FIG. 6(A)) has two or three adjacent edges (i.e., 89C-1R and 89C-1L) fully facing window boundary edges 81C-R and 81C-L, and the second type (e.g., "type 2" don't care region 89C-2, shown in FIG. 6(B)) is disposed between facing edges 83C-2R and 83C-2L of block structure 83C-2. As mentioned above, "type 1" don't care regions are discarded, and special boundary tiles (e.g., boundary tiles 118C-1 and 118C-2, shown in FIGS. 6(C) and 6(D)) are added to the pattern topologies during enumeration. Because the boundary tile is a "special" pattern window boundary (i.e., not a block or space tile), no critical design rules are extracted using the first through fifth extraction rules described above. Because some block or space tiles may be affected by the boundary tiles (adjacent block/space tile and boundary tile have directed edges connect between them), the sixth "don't care region" rule is added to handle hotspot patterns that contain "type 2" don't care regions.

Figure 14A:
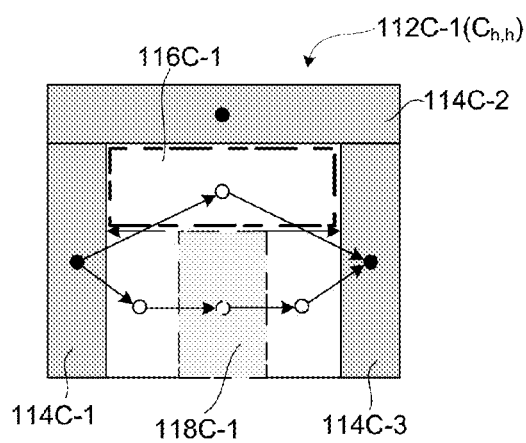
FIGS. 14(A), 14(B), 14(C) and 14(D) illustrate a sixth extraction rule dealing with don't care regions.
Figure 14B:
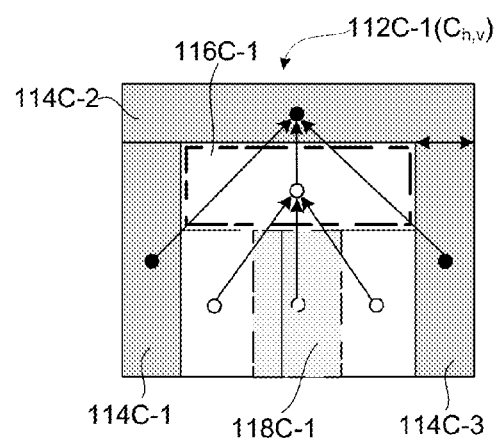
Figure 14C:
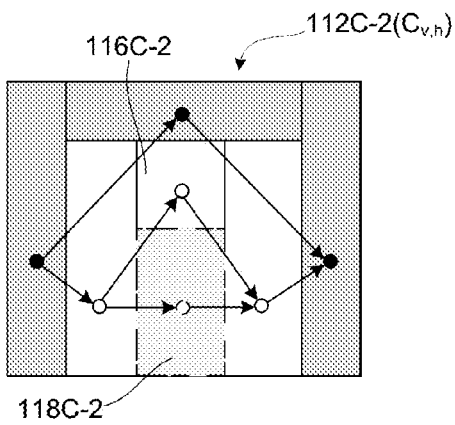
Figure 14D:
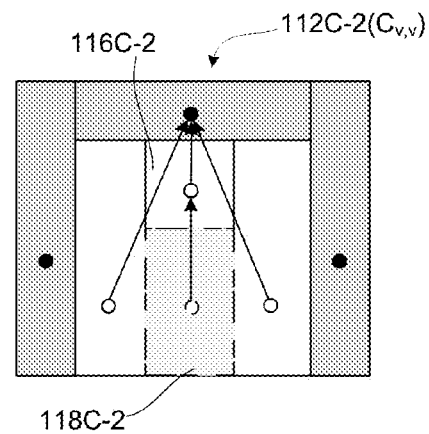

In one embodiment, the sixth (don't care region) extraction rule involves identifying each space tile with one edge (or two opposite edges) touching a "type 2" boundary tile. FIGS. 14(A) and 14(B) respectively show MTCG constraint graphs $C_{h,h}$ and $C_{h,v}$ for horizontally sliced pattern topology 112C-1, and FIGS. 14(C) and 14(D) respectively show MTCG constraint graphs $C_{v,h}$ and $C_{v,v}$ for vertically sliced pattern topology 112C-2. Applying the sixth extraction rule, a space vertex for space tile 116C-1 is extracted (and a critical design rule formed) because it has zero (none) indegrees connected to block tiles 114C-1 to 114C-3 and has one or more indegrees connected to boundary tile 118C-1 in constraint graph $C_{h,v}$ (FIG. 14(A)), and has nonzero incoming and outgoing edges connected to block vertices 114C-1 to 114C-3 in constraint graph $C_{h,h}$ (FIG. 14(B)). Note that the vertex for space tile 116C-2 (FIGS. 14(C) and 14(D)) fails the extraction rule test because it has zero indegrees connected to boundary tile 118C-2 in constraint graph $C_{v,h}$ (FIG. 14(C)). In an alternative application of the sixth extraction rule using constraint graphs, a space vertex is extracted that has zero outdegrees connected to block tiles and one or more outdegrees connected to boundary tiles in constraint graph $C_{h,v}$ ($C_{v,h}$), and has nonzero incoming and outgoing edges connected to block vertices in constraint graph $C_{h,h}$ ($C_{v,v}$).

According to an embodiment of the present invention, the extracted topological features generated using the six extraction rules described above are quantified (represented) using "rule rectangles" from which critical design rules are formed. A rule rectangle is the associated width and height of a topological feature. The height and width of a rule rectangle are defined by its corresponding edge constraints in the constraint graph.

FIG. 15(A) shows an exemplary pattern topology 112I disposed in window boundary 111I. Pattern topology 112I includes block tiles 114I-1 to 114I-4 and space tiles 116I-1 to 116I-5. Assuming space tile 116I-1 is the extracted feature (i.e., a space tile between block tiles and not touching a window boundary based on the second extraction rule), rule rectangle RR(112I) for space tile 116I-1 is determined by its width W and height H. In one embodiment, the critical design rules (e.g., rules R1 to R8 in block 120A, FIG. 2) comprise (or are generated from) rule rectangles. Note that two rule rectangles having the same width and height may be generated from different pattern topologies. When this occurs, a single rule is generated for purposes of reducing DRC processing time. For example, rule R2 (see block 120A, FIG. 2) represents identical rule rectangles generated from pattern topologies 112-11 and 112-12, and thus both of these pattern topologies are represented by rule R2. During DRC processing, rule R2 is processed only once for both pattern topologies.

FIGS. 15(B) and 15(C) show another pattern topography 112J and a corresponding simplified constraint graph 112J-C, respectively, according to another embodiment. In FIG. 15(B), space tile 116J is extracted (selected) as a critical feature by way of the third (diagonal) extraction rule, and block tile 114J is extracted by way of the fourth (longedge) extraction rule. Rule rectangles are generated for each of these tiles, with the height (width) of space tile 114J being defined by coordinate values (m1, n1) and (m2, n2)), the height of block tile 116J being defined by value (m1, n1), the width of block tile 114J being defined by (m1, ?), where "?" means the upper bound of this width is not know because the right edge of this tile touches (and therefore may extend beyond) the window boundary. Note that segment rules will not be extracted if there are more than two internal topological relations extracted.

Referring to block 130A in FIG. 2, rule ordering is performed as generally described above to arrange the critical design rules generated during rule extraction (block 120A) into an order in which DRC processing is performed. As set forth above, rule ordering generally involves grouping the extracted critical design rules into at least two rule groups, where the first group of critical design rules are applied to the entire layout pattern during first phase DRC processing, and the remaining critical design rules are the applied to a reduced layout pattern after searching space reduction is performed. In one embodiment, in addition to grouping, the critical design rules are also "ordered" (i.e., rearranged in an order in which the rules are processed by the DRC tool) based on a predetermined priority, such as based on a number of pattern topologies represented by each said critical design rule, or the types of extraction rule utilized to identify each critical design rules. Each of these order priority strategies is described in additional detail in the following paragraphs.

Figure 16:
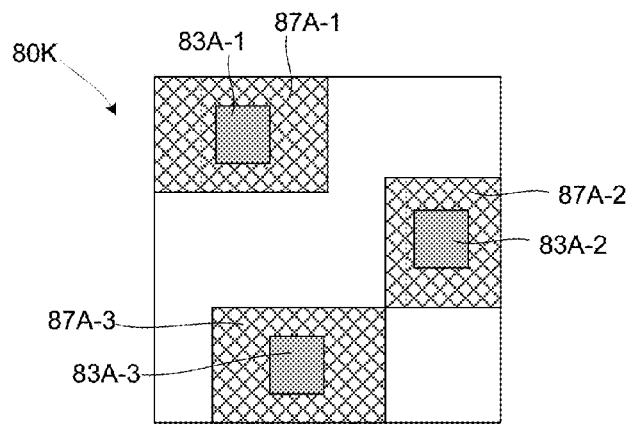
FIG. 16 depicts a hotspot pattern including multiple edge tolerances.
Figure 17:
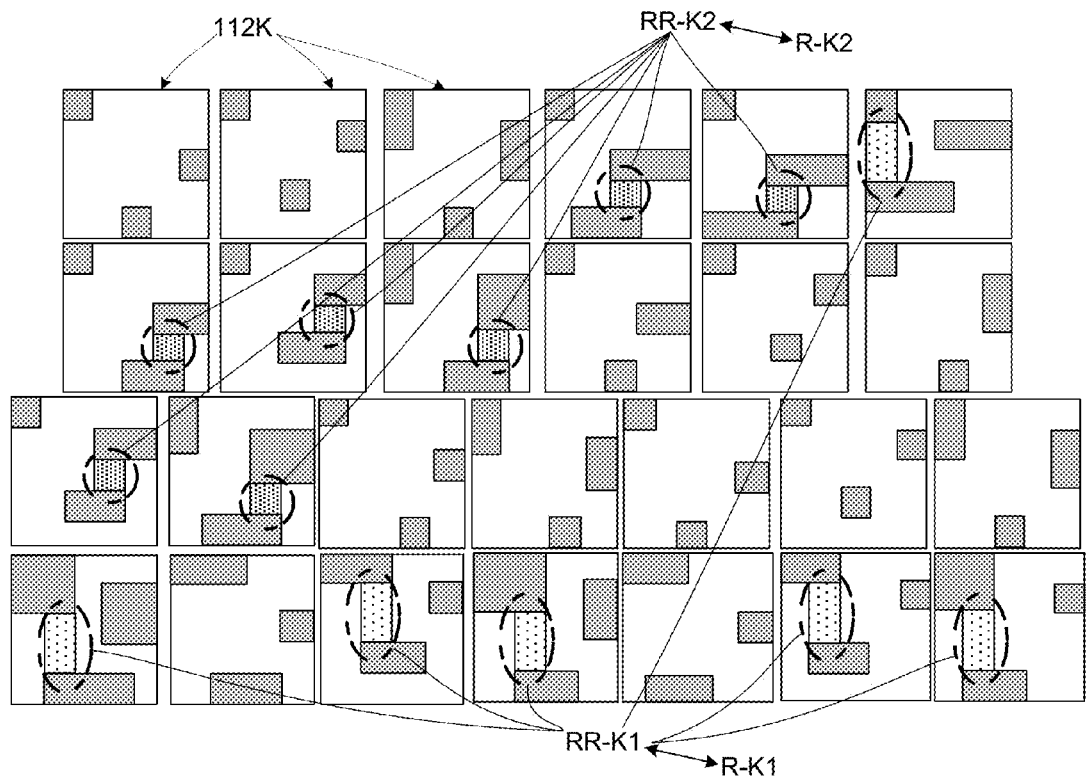
FIG. 17 depicts twenty-seven different enumerated pattern topologies created from the hotspot pattern of FIG. 16.

The first order priority strategy (i.e., basing priority on a number of pattern topologies represented by each said critical design rule) is achieved by assigning similar rule rectangles generated in multiple pattern topologies to a single critical design rule, and assigning a highest priority to the critical design rule covering a largest number of pattern topologies. Hotspot patterns including even a small number of edge tolerances may generate a very large number of different pattern topologies after pattern enumeration. For example, hotspot pattern 80K shown in FIG. 16 includes only three block polygons 83K-1 to 83K-3, but each polygon has a two-way edge tolerance (indicated by regions 87K-1 to 87K-3), which produces the twenty-seven different pattern topologies 112K shown in FIG. 17 using the enumeration methods described above, many of the different topologies generating identical rule rectangles. For example, rule rectangle RR-K1 appears in six of the twenty-seven pattern topologies 112K shown in FIG. 17, but does not appear in the other nineteen pattern topologies, and the rule rectangles RR-K1 in each of the six pattern topologies is "covered" during DRC by processing a single "shared" critical design rule R-K1. Similarly, rule rectangle RR-K2 appears in seven of the twenty-seven pattern topologies shown in FIG. 17, and the rule rectangles RR-K2 in each of the seven pattern topologies is "covered" during DRC by "shared" critical design rule R-K2. According to an embodiment of the first order priority strategy, a region AND technique is utilized to identify similar rule rectangles that appear in the various pattern topologies, whereby DRC processing time is reduced by searching for the "shared" critical design rule once (i.e., instead of searching multiple times, which would occur if each rule rectangle is assigned one critical design rule). The topology covering problem is a NP-hard problem. NP-hard means a problem that is at least as hard as any NP problems. A NP problem is verifiable in polynomial time. What we mean here is that if we were somehow given a certificate of a solution, then we could verify that the certificate is correct in time polynomial in the size of the input to the problem, which is equivalent to the set covering problem, which tries to cover the whole set with fewest subsets. For example, given a set U={1, 2, 3, 4, 5} and four subsets S={{1, 2, 3}, {2, 4}, {3, 4}, {4, 5}}. To cover all elements in U with fewest subsets, subset {1, 2, 3} and subset {2, 4} are chosen. A greedy heuristic can be applied to this problem. After each set covering process, the set that contains the largest number of uncovered elements in U is chosen. In the same manner, a critical design rule is selected that contains the largest number of uncovered pattern topologies during the topology covering process. Referring back to the example shown in FIG. 17, because rule rectangle RR-K2 covers seven pattern topologies and rule rectangle RR-K1 covers only six, the critical design rule R-K2 associated with rule rectangle RR-K2 is selected first (given higher ordering priority over rule R-K1 associated with rule rectangle RR-K1) because it covers the largest number of uncovered pattern topologies. Next, the critical design rule associated with rule rectangle RR-K1 is selected because it covers the next largest group of pattern topologies. This process is repeated until all twenty-seven pattern topologies are covered (i.e., at least one critical design rule from each of the twenty-seven pattern topologies is included in the first group). As explained below, each chosen rule of the first group will be searched within the full layout pattern during a first DRC phase. In one embodiment, the region AND technique is performed for each chosen rule after the first DRC run phase. Next, a union is taken on these ANDed regions to form a new DRC searching space (e.g., reduced layout pattern 90-1A shown in FIG. 2). The rest of rules will only be applied to the new searching space, and no more region AND techniques will be used.

According to a second order priority strategy, the critical design rules are assigned priorities based on the extraction rule used to generate that critical design rule. As described above, critical design rules are generated using the six defined extraction rules. According to a specific embodiment, critical design rules are assigned priorities based on the following order of application: critical design rules generated by the internal (first), external (second) and diagonal (third) extraction rules are given the highest priority, critical design rules generated by the longedge (fourth) and don't care region (sixth) extraction rules are given medium priority, and critical design rules generated by the segment (fifth) extraction rule (rule "5") are given the lowest priority. Rules with higher priorities will be chosen first even if their covered topologies are lesser than lower priorities.

Referring to the lower portion of FIG. 2, DRC processing (block 140A) is performed for each of the extracted rules using one of the ordering strategies described above. Each set of design rules is referred to as a runset, and each runset is submitted to the DRC tool in a runset file.

Figure 18A:
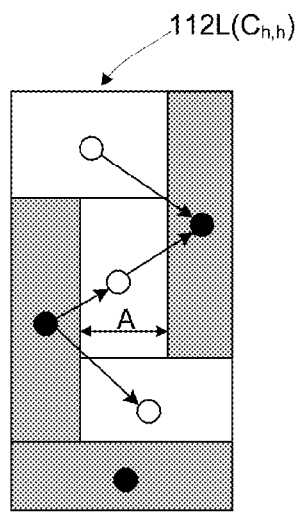
FIGS. 18(A) and 18(B) show constraint graphs for another exemplary hotspot pattern.
Figure 18B:
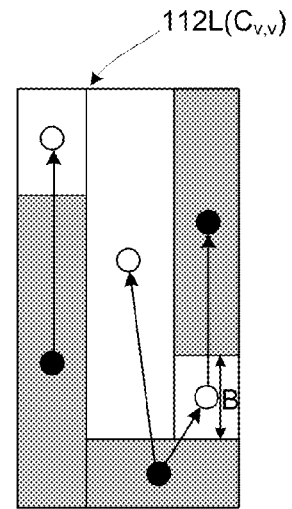
Figure 19A:
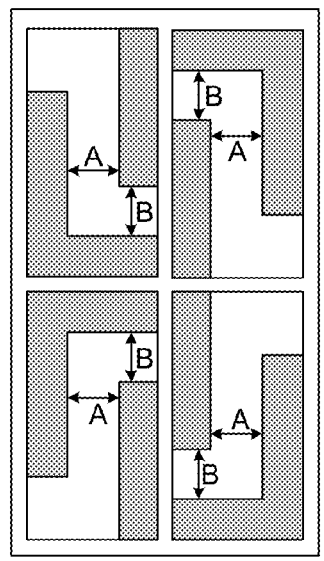
FIGS. 19(A) and 19(B) collectively show eight possible orientations of actual hotspot regions satisfying the critical rules generated in the constraint graphs of FIGS. 18(A) and 18(B)
Figure 19B:
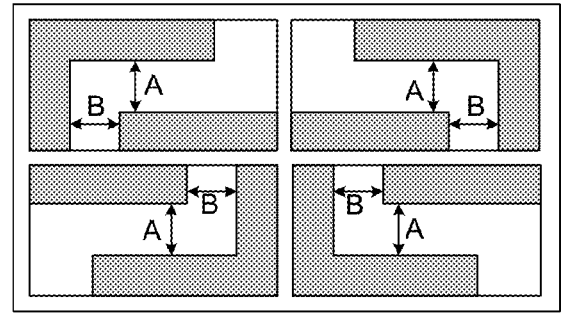

According to an embodiment of the present invention, performing DRC processing comprises generating two runset files in which the critical design rules are processed to cover eight possible orientations of layout structures that match the foundry-provided hotspot pattern. For example, FIGS. 18(A) and 18(B) respectively show two MTCG constraint graphs 112L($C_{h,h}$) and 112L($C_{v,v}$) generated for an exemplary basic hotspot pattern, where the two constraint graphs are sliced using horizontal and vertical cut lines, respectively, and two rule rectangles (indicated in simplified form by arrows "A" and "B") are extracted using the methods described above to express vertical and horizontal geometric relationships. FIGS. 19(A) and 19(B) depict layout structures having eight possible orientations within a layout pattern that satisfy rules A and B. Note that rule A has a first (i.e., horizontal) orientation in the four orientations of FIG. 19(A), and has a second (vertical) orientation in the four orientations of FIG. 19(B), where the second orientation is rotated 90° from the first orientation. That is, as indicated by FIG. 19(A), rules A extracted from $C_{h,h}$ constraint graphs are always perpendicular to rules B extracted from $C_{v,v}$. Thus, we can restrict the rule searching direction of rules A and B (one in vertical and one in horizontal direction) in DRC to reduce the searching space. Consequently, the eight orientations shown in FIGS. 19(A) and 19(B) are divided into two sets to sustain these two relationships (representative orientations), and a runset file is then generated for each set. DRC is then performed twice to obtain the locations that hit any generated rule.

Referring again to FIG. 2, searching space reduction (block 144) is performed after first phase DRC processing to reduce DRC processing time. That is, because each enumerated pattern topology is represented by at least one critical design rule in the first group, only those regions of the entire layout pattern (e.g., layout pattern 90-1 in FIG. 2) that are identified as including layout structures that match at least one critical design rule could possibly include layout structures that match the foundry-provided hotspot pattern (e.g., pattern 80 in FIG. 2). By generating a reduced layout pattern (e.g., reduced layout pattern 90-1A, shown in FIG. 2) that omits layout regions located too far from any "matched" layout structure (i.e., a layout structure that satisfies a critical design rule processed during the first DRC phase), and then performing the second phase DRC processing using the reduced layout pattern, the methodology of the present invention greatly reduces overall DRC processing time without sacrificing hotspot detection accuracy.

Searching space reduction may be accomplished using a variety of methods that identifies non-relevant layout pattern regions (i.e., regions that cannot include a hotspot, based on the first phase DRC results), and then generating a reduced layout pattern by omitting (i.e., erasing or otherwise ignoring) the non-relevant regions during the second DRC phase. In one embodiment, searching space reduction is achieved using expanded pattern windows that take into account the space occupied by each rule rectangle in any of four possible rotational orientations, and then utilizes the expanded pattern windows after the first DRC phase to remove all layout regions located outside of at least one expanded pattern window. A simplified example of this searching space reduction technique is described below with reference to FIGS. 20 to 22.

Figure 20:
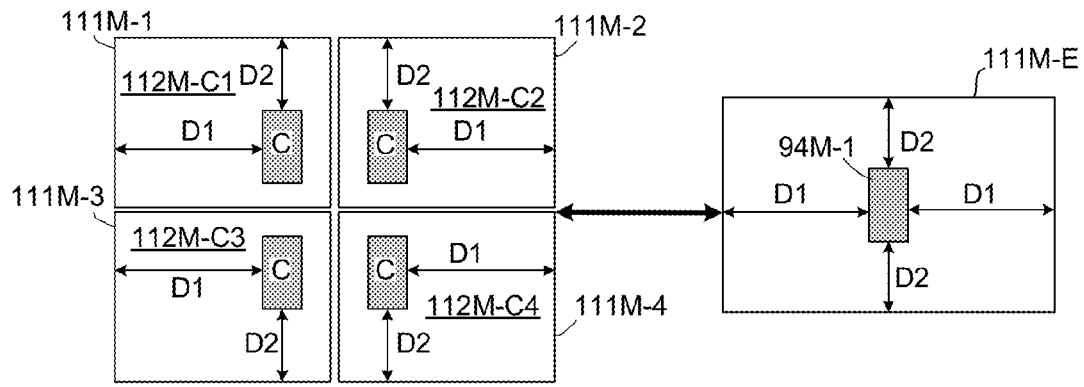
FIG. 20 illustrates the calculation of an expanded pattern window for a critical design rule utilized in searching space reduction.

FIG. 20 depicts determining an expanded pattern window 111M-E for a critical design rule related to rule rectangle "C". To make sure that any of the four orientations of the pattern topology including rule rectangle "C" are identified in a layout pattern, expanded pattern window 111M-E is generated according to the position of rule rectangle "C" in all four possible orientations. Specifically, for each of the four orientations shown in FIG. 20, the longest horizontal distance and longest vertical distance from the pattern window are determined, and those longest distances are used to generate the expanded pattern window for rule rectangle "C". For example, referring to the upper left of FIG. 2, the longest horizontal distance D1 separates rule rectangle "C" from the left side of pattern window 111M-1, and the longest vertical distance D2 separates rule rectangle "C" from the upper edge of pattern window 111M-1. The upper right box of FIG. 20 shows rule rectangle "C" after being flipped around a vertical axis, whereby distance D1 separates rule rectangle "C" from the right side of pattern window 111M-2, and rule rectangle "C" remains separated from the upper edge by distance D2. The lower portion of FIG. 20 shows rule rectangle "C" after being flipped around a horizontal axis, whereby rule rectangle "C" is separated from the left side of pattern window 111M-3 and from the right side of pattern window 111M-4 by distance D1, and from the lower edges of these pattern windows by distance D2. As indicated in the right portion of FIG. 20, based on these measurements, an expanded pattern window 111M-E is generated for critical design rule "C" having window side edges disposed distance D1 from side edges of rule rectangle "C", and upper/lower window edges disposed distance D2 from upper/lower edges of rule rectangle "C", whereby any layout structure that matches critical design rule "C" and has any of the four depicted orientations would be disposed inside expanded pattern window 111M-E.

Figure 21:
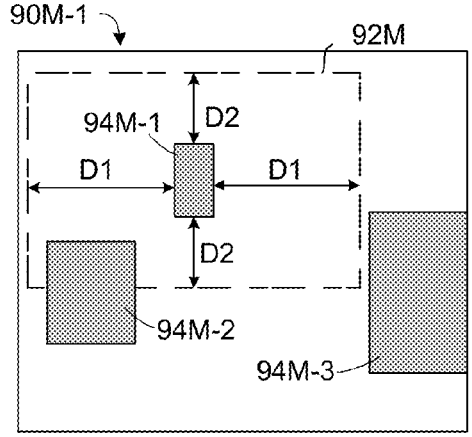
FIG. 21 illustrates a portion of a layout pattern including a layout structure that matches the critical design rule of FIG. 20.
Figure 22:
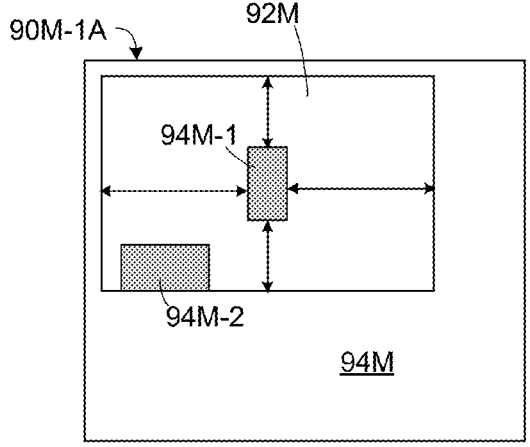
FIG. 22 illustrates a simplified reduced layout pattern generated after removing layout regions located outside of the expanded pattern window described above with reference to FIG. 20.

FIGS. 21 and 22 depict the generation of a simplified reduced layout pattern using expanded pattern window 111M-E. FIG. 21 depicts partial DRC processing results in which a layout structure 94M-1 of an initial layout pattern 90M-1 is identified that matches critical design rule "C". Note the proximity of layout structure 94M-1 to two other layout structures 94M-2 and 94M-3. At the completion of the first DRC processing phase, a reduced layout pattern is generated for the second DRC phase by removing ("erasing") all layout regions located outside of search regions that are delineated by the expanded pattern windows associated with any layout structures that match any of the critical design rules. For example, referring to FIG. 21, the dashed-line box indicates a delineated search region 92M around identified layout structure 94M-1 that corresponds to expanded pattern window 111M-E. Note that layout structure 94M-2 is bisected by the lower edges of delineated search region 92M, and that layout structure 94M-3 is located entirely outside of delineated search region 92M. FIG. 22 depicts a simplified reduced layout pattern 90M-1A including only structures disposed inside search region 92M, where all layout structures located outside of search region 92M (e.g., structure 94M-3 and the lower portion of structure 94M-2) are removed. Subsequent rules will be applied only within the newly formed searching space.

Referring briefly to FIG. 1, once DRC is completed, candidate hotspots are identified (block 150) using the DRC results.

Figure 23:
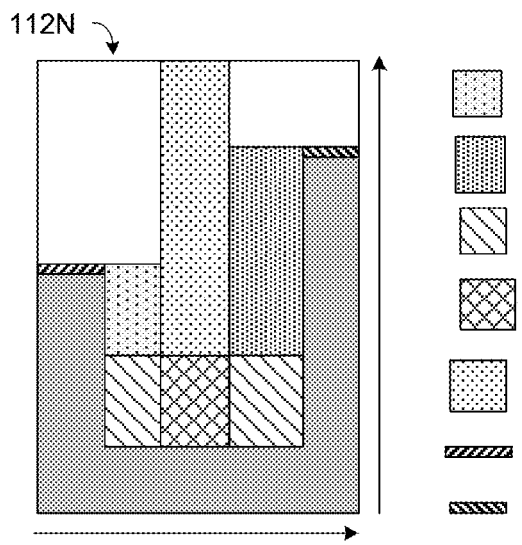
FIG. 23 illustrates a constraint graph including multiple rule rectangles for a pattern topology.

Candidate hotspot identification generally involves identifying in the DRC results patterns of matched critical design rules that correspond with any of the enumerated pattern topologies. Each enumerated pattern topology is represented by a set of critical design rules utilized during DRC. Thus, a pattern topology can be captured and the impact of don't care regions can be neglected by encoding only the pattern topology's rule rectangles to two strings, one in the vertical direction and the other in the horizontal direction. As shown in FIG. 23, to capture the horizontal rule topology of the exemplary Mountain pattern topology 112N, first, a unique layout metal layer number is assigned for each rule rectangle 1 to 7. In this case, seven different rule rectangles will be assigned with different metal layer numbers. These unique rule layers will also be used by the DRC tool to indicate the matched rectangles in the layout. For example, if we assign metal layer 1 to rule rectangle 7, after DRC, all matched locations of rule rectangle 7 will be marked by metal 1 layer. Next, the left edge and right edge of a rectangle (horizontal line segment) are named as "#.l" and "#.r" ("#" is the layer number), and "#.m" is used to denote a vertical line segment.

Figure 24:
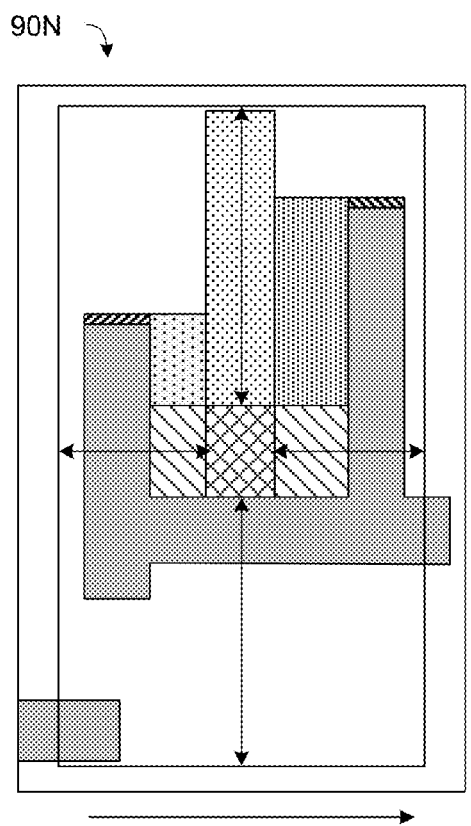
FIG. 24 illustrates a layout pattern region including layout structures similar to those of the pattern topology modeled by the constraint graph of FIG. 23.

As an example, the horizontal encoding of the pattern Mountain in 1D data string is {6.l, 1.l, 3.l, 6.r, 1.r, 4.l, 5.l, 2.l, 4.r, 5.r, 2.r, 3.r, 7.l, 7.r}. Edges on the same coordinates will be sorted by layers and will be bound together. The vertical direction is encoded in the same manner. To identify the candidate hotspots (potential hotspot locations) in the layout pattern, based on DRC results and rule priorities, layout matched rules with higher priority will be selected as the candidates, and will be expanded to cover all four possible orientations (depending on the DRC runset). Then, edges are encoded by layers inside this region and the longest common subsequence between hotspot strings and current strings is determined. As shown in FIG. 24, the vertical edges of layout structures in a layout pattern 90N are encoded to form a horizontal string within the expanded region of candidate rule "4", and a search is performed for the longest common subsequence. A layout pattern feature is considered an identified candidate (match) if the longest common subsequence is the hotspot string itself (e.g., {6.l, 1.l, 3.l, 6.r, 1.r, 4.l, 5.l, 2.l, 4.r, 5.r, 2.r, 3.r, 7.l, 7.r} in this example).

Referring again to FIG. 1, the last process of framework 100 is finalization (block 160). After identifying all candidate hotspot locations, it is still necessary to analyze each candidate location to determine if an actual hotspot exists at that location. That is, some non-hotspot locations might be identified as candidate locations. Such non-hotspot candidate locations may, for example, contain extra layout structures (polygons) that are not related to any of the extracted critical design rules, and are not located within a "don't care" region. For example, an exemplary pattern topology 112O shown in FIG. 25(A) may produce critical design rules that cause identification of the candidate layout region 90O shown in FIG. 25(B). Pattern topology 112O includes block tiles 84O-1 to 84O-3 and don't care regions 89O-1 and 89O-2. Layout region 90O includes layout structures 94O-1 to 94O-3 that match up with block tiles 84O-1 to 84O-3, and an extra layout structure 94O-4. Even though candidate layout region 90O includes an extra polygon 94O-4 that is not part of pattern topology 112O, this region may be identified as a candidate hotspot pattern due to the similarities between the other structures (e.g., if block tile 84O-1 forms a rule rectangle, then layout pattern 90O may be identified as a candidate hotspot even though it includes layout structure 94O-4). According to an embodiment of the present invention, finalization includes checking each identified candidate location for the presence of extra polygons, and then determining whether the extra polygons are fully covered by don't care regions or not (e.g., whether any extra polygons are fully located inside don't care regions included in the original foundry-provided hotspot pattern). To identify extra polygons, the candidate layout region is processed to remove any structures located inside don't care regions, and then the residual pattern is analyzed using a corresponding constraint graph. An exemplary constraint graph is shown in FIG. 26(A), where the don't care regions cause the removal of most of layout structure 94O-4 (see FIG. 25(B)), but leave the polygon "K" section that extends between the don't care regions. Next, the residual layout pattern is sliced (e.g., using vertical slice lines 97) and compared with slice data from the original pattern topology. If the number of generated slices within each slice is different from the pattern topology, then the candidate layout region is not a hotspot. That is, the presence of polygon "K" in FIG. 26(A) causes layout pattern 90O to fail as match to the constraint graph show in FIG. 25(A). In contrast, if polygon "K" were omitted, the resulting constraint graph shown in FIG. 26(B) would include the correct number of slice lines 97, and the associated layout region would be reported as an actual hotspot.

The above-described process hotspot detection technique can be implemented in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Figure 27:
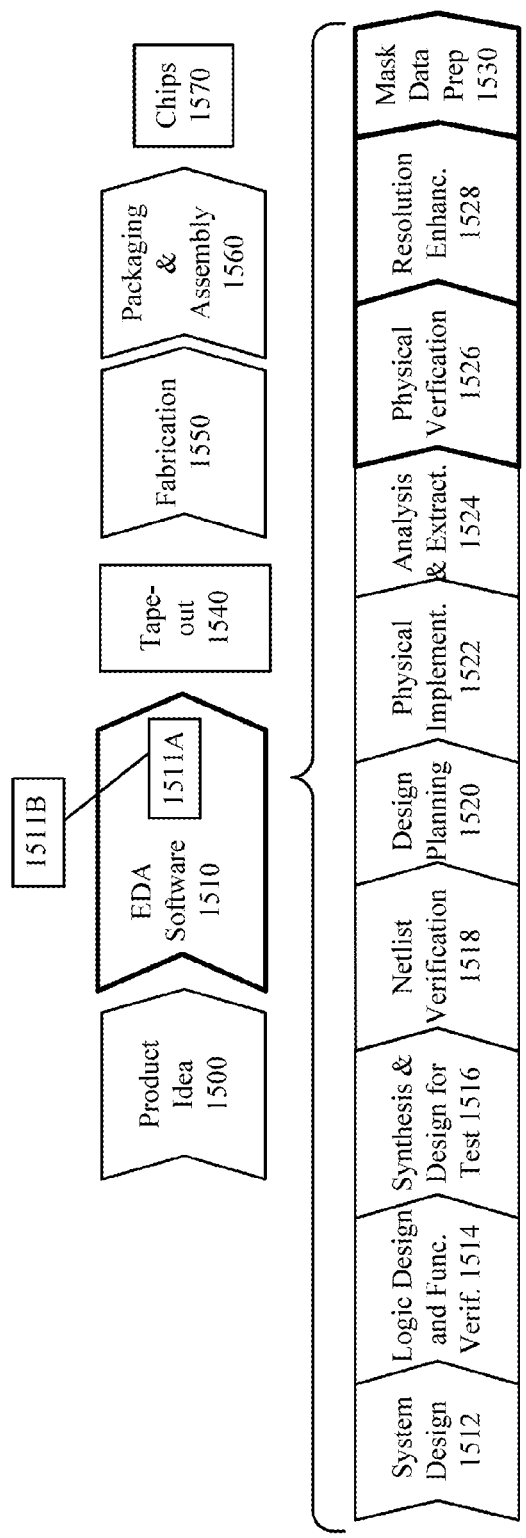
FIG. 27 shows a simplified representation of an exemplary digital ASIC design flow including the accurate process hotspot detection technique described above.

FIG. 27 shows a simplified representation of an exemplary digital ASIC design flow including the accurate process hotspot detection technique described above. At a high level, the process starts with the product idea (step 1500) and is realized in an EDA software design process (step 1510). When the design is finalized, it can be taped-out (event 1540). After tape out, the fabrication process (step 1550) and packaging and assembly processes (step 1560) occur resulting, ultimately, in finished chips (result 1570).

The EDA software design process (step 1510) is actually composed of a number of steps 1512-1530, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components/steps of the EDA software design process (step 1510) will now be provided. In one embodiment, one or more steps of the EDA software design process can be implemented using a computer-readable medium 1511A, which is read by a computer 1511B. Note that Astro, AstroRail, CustomSim, ESP, Hercules, IC Compiler, Magellan, Model Architect, Power Compiler, PrimeRail, Proteus, ProteusAF, PSMGen, Saber, StarRC, and System Studio are trademarks of Synopsys, Inc., and CATS, DesignWare, Design Compiler, Formality, HSIM, Leda, NanoSim, Primetime, Syndicated, TetraMAX, VCS, and Vera are registered trademarks of Synopsys, Inc. System design (step 1512): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect™, Saber™, System Studio™, and DesignWare® products.

Logic design and functional verification (step 1514): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include HSIM®, NanoSim®, CustomSim™, VCS®, VERA®, DesignWare®, Magellan™, Formality®, ESP™ and LEDA® products.

Synthesis and design for test (step 1516): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler™, Tetramax®, and DesignWare® products.

Netlist verification (step 1518): At this step, the netlist is checked for compliance with timing constraints and for correspondence with the VHDL/Verilog source code. Exemplary EDA software products from Synopsys, Inc. that can be used at this step include Formality®, PrimeTime™, and VCS® products.

Design planning (step 1520): Here, an overall floorplan for the chip is constructed and analyzed for timing and top-level routing. Exemplary EDA software products from Synopsys, Inc. that can be used at this step include Astro™ and IC Compiler™ products.

Physical implementation (step 1522): The placement (positioning of circuit elements) and routing (connection of the same) occurs at this step. Exemplary EDA software products from Synopsys, Inc. that can be used at this step include the Astro™ and IC Compiler™ products.

Analysis and extraction (step 1524): At this step, the circuit function is verified at a transistor level, this in turn permits what-if refinement. Exemplary EDA software products from Synopsys, Inc. that can be used at this step include AstroRail™, PrimeRail™, Primetime®, and Star RC/XT™ products.

Physical verification (step 1526): At this step various checking functions are performed to ensure correctness for: manufacturing, electrical issues, lithographic issues, and circuitry. Exemplary EDA software products from Synopsys, Inc. that can be used at this step include the Hercules™ product. In one embodiment, the process hotspot detection technique using critical design rule extraction can be used in step 1526.

Resolution enhancement (step 1528): This step involves geometric manipulations of the layout to improve manufacturability of the design. Exemplary EDA software products from Synopsys, Inc. that can be used at this step include Proteus™, ProteusAF™, and PSMGen™ products. In one embodiment, the process hotspot detection technique using critical design rule extraction can be used in step 1528.

Mask data preparation (step 1530): This step provides the "tape-out" data for production of masks for lithographic use to produce finished chips. Exemplary EDA software products from Synopsys, Inc. that can be used at this step include the CATS® family of products. In one embodiment, the process hotspot detection technique using critical design rule extraction can be used in step 1530.

As indicated above, physical verification step 1526, resolution enhancement step 1528, and mask data preparation step 1530 can benefit from pattern matching. Currently, most pattern matching is done by manually writing DRC rules for each pattern and then searching the entire layout to find occurrences. Advantageously, by using the above-described process hotspot detection technique using critical design rule extraction, pattern matching can be automated, thereby significantly improving turn around time from product idea 1500 to tape-out 1540.

Although illustrative embodiments of the invention have been described in detail herein with reference to the accompanying figures, it is to be understood that the invention is not limited to those precise embodiments. Thus, the scope of the invention is defined by the following claims and their equivalents.

The invention claimed is:

1. A method for detecting actual hotspot regions in an initial layout pattern and generating detected actual hotspot data operably configured for use in the subsequent production of a lithographic mask that is utilized in a semiconductor fabrication process to fabricate an integrated circuit, said method using a hotspot pattern including at least one opaque portion and at least one transparent portion disposed within a window boundary, and at least one of an edge tolerance range and an unspecified region, the method comprising, using a processor to perform the following:

generating a plurality of pattern topologies based on corresponding alternative block arrangements defined by said hotspot pattern, each said pattern topology comprising a plurality of block tiles and a plurality of space tiles disposed in a unique pattern arrangement;

extracting a plurality of critical design rules from the plurality of pattern topologies such that each of the plurality of pattern topologies is represented by at least one said critical design rule;

grouping the critical design rules into at least two rule groups, where a first said rule group includes first critical design rules from each of said plurality of pattern topologies, and a second group includes second critical design rules from at least some of said plurality of pattern topologies;

performing first DRC processing on said initial layout pattern using said first critical design rules;

generating a reduced layout pattern by modifying said initial layout pattern to include only regions identified as satisfying at least one first critical design rule during said first DRC processing;

performing second DRC processing on said reduced layout pattern using said second critical design rules; and generating said detected actual hotspot data using results from said second DRC processing.

2. The method of claim 1, wherein generating said plurality of pattern topologies comprises:

slicing the hotspot pattern to form said plurality of block tiles and said plurality of space tiles;

generating pattern sets for each edge pair defined by an edge tolerance;

converting each pattern set into pattern subsets; and generating a corresponding pattern topology for each pattern subset.

3. The method of claim 2, wherein slicing the hotspot pattern comprises, when slicing a pattern structure affected by an edge tolerance, binding two or more polygons generated by said slicing along an edge affected by the edge tolerance.

4. The method of claim 2, wherein generating pattern sets and converting each pattern set into pattern subsets comprises utilizing an All-Pair Min-Range Path (APMRP) algorithm.

5. The method of claim 1, wherein said hotspot pattern includes said unspecified region, and wherein enumerating said plurality of pattern topologies comprises assigning one or more boundary tiles in regions of each said generated pattern topology corresponding to said unspecified region only when said unspecified region is disposed between two facing edges of corresponding said opaque portions.

6. The method of claim 1, wherein extracting said plurality of critical design rules comprises determining positional relationships of the plurality of block tiles and the plurality of space tiles in each of the plurality of enumerated pattern topologies, applying a plurality of extraction rules to each of the enumerated pattern topologies to identify critical features defined by the determined positional relationships, and then generating a critical design rule for each of the identified critical features.

7. The method of claim 6, wherein determining positional relationships of the plurality of block tiles and the plurality of space tiles in each of the plurality of enumerated pattern topologies comprises generating directed edges that quantify positional relations between adjacent pairs of said block tiles and space tiles.

8. The method of claim 6, wherein extracting said plurality of critical design rules comprises generating a plurality of modified transitive closure graphs (MTCGs).

9. The method of claim 6, wherein applying the plurality of extraction rules comprises measuring a width and a height of a block tile only when the block tile does not touch a window boundary of said each of the plurality of enumerated pattern topologies.

10. The method of claim 6, wherein applying the plurality of extraction rules comprises determining a distance between two adjacent block tiles by measuring a width and a height of a space tile that does not touch the window boundary of said each of the plurality of enumerated pattern topologies and is located between two block tiles.

11. The method of claim 10, wherein applying the plurality of extraction rules comprises measuring a distance between two convex corners formed by block tiles.

12. The method of claim 6, wherein applying the plurality of extraction rules comprises identifying a space tile or a block tile having a single edge touching the window boundary.

13. The method of claim 6, wherein applying the plurality of extraction rules comprises identifying a space tile having exactly two edges touching the window boundary.

14. The method of claim 6, wherein applying the plurality of extraction rules comprises identifying each space tile having at least one edge touching a boundary tile.

15. The method of claim 6, wherein generating said critical design rule for each said identified critical feature comprises quantifying said each identified critical feature using a rule rectangle including size values of said each identified critical feature within a pattern window.

16. The method of claim 15, wherein ordering the critical design rules comprises assigning similar rule rectangles generated in multiple pattern topologies to a single critical design rule, and assigning a highest priority to a critical design rule covering a largest number of pattern topologies.

17. The method of claim 1,
wherein extracting said plurality of critical design rules comprises applying a plurality of extraction rules to each of the pattern topologies such that each critical design rule is extracted in accordance with an associated said extraction rule, and
wherein ordering the critical design rules comprises assigning a priority to each critical design rule based on its associated said extraction rule.

18. The method of claim 1, wherein performing first DRC processing comprises generating two runset files covering eight possible orientations for the hotspot pattern, wherein the first runset file includes said critical design rules having first representative orientations, and the second runset file includes said critical design rules having second representative orientations that are rotated 90° to said first representative orientations.

19. The method of claim 1, wherein generating a reduced layout pattern comprises:
determining an expanded pattern window for a critical design rule such that said critical design rule is disposed inside said expanded pattern window in any orientation,
during first DRC processing, identifying a layout structure in said initial layout pattern that matches said critical design rule, and
generating said reduced layout pattern by:
delineating a search region around said identified layout structure corresponding to the expanded pattern window, and
removing layout structures located outside of said delineated search region.

20. The method of claim 1, further comprising:
generating at least one data string identifying positional relationships between critical design rules associated with each said pattern topology; and
identifying candidate hotspot regions in the initial layout pattern by analyzing positional relationships between matched critical design rules identified during said first and second DRC processing, and identifying a longest common subsequence of said at least one data string.

21. The method of claim 20, further comprising:
determining if the identified candidate location includes an extra layout structure that is not included in a corresponding enumerated pattern topology, and
determining if the extra layout structure is fully located inside said unspecified region of said hotspot pattern.

22. A non-transitory, computer-readable medium storing computer-executable instructions for providing hotspot detection, the instructions when executed by a processor cause the processor to execute a process comprising a method for detecting actual hotspot regions in an initial layout pattern and generating corrected layout pattern data operably configured for use in the production of a lithographic mask utilized in a semiconductor fabrication process to fabricate an integrated circuit, said method using a hotspot pattern including at least one opaque portion and at least one transparent portion disposed within a window boundary, and at least one of an edge tolerance range and an unspecified region, the method comprising:
generating a plurality of pattern topologies based on corresponding alternative block arrangements defined by said hotspot pattern, each said pattern topology comprising a plurality of block tiles and a plurality of space tiles disposed in a unique pattern arrangement;
extracting a plurality of critical design rules from the plurality of pattern topologies such that each of the plurality of pattern topologies is represented by at least one said critical design rule;

grouping the critical design rules into at least two rule groups, where a first said rule group includes first critical design rules from each of said plurality of pattern topologies, and a second group includes second critical design rules from at least some of said plurality of pattern topologies;

performing first DRC processing on said initial layout pattern using said first critical design rules;

generating a reduced layout pattern by modifying said initial layout pattern to include only regions identified as satisfying at least one first critical design rule during said first DRC processing;

performing second DRC processing on said reduced layout pattern using said second critical design rules; and generating said corrected layout pattern data using results from said second DRC processing.

23. A system comprising:

a processor configured to execute a process comprising a method for detecting actual hotspot regions in an initial layout pattern and generating corrected layout pattern data operably configured for use in the production of a lithographic mask utilized in a semiconductor fabrication process to fabricate an integrated circuit, said method using a hotspot pattern including at least one opaque portion and at least one transparent portion disposed within a window boundary, and at least one of an edge tolerance range and an unspecified region, the method comprising:

generating a plurality of pattern topologies based on corresponding alternative block arrangements defined by said hotspot pattern, each said pattern topology comprising a plurality of block tiles and a plurality of space tiles disposed in a unique pattern arrangement;

extracting a plurality of critical design rules from the plurality of pattern topologies such that each of the plurality of pattern topologies is represented by at least one said critical design rule;

grouping the critical design rules into at least two rule groups, where a first said rule group includes first critical design rules from each of said plurality of pattern topologies, and a second group includes second critical design rules from at least some of said plurality of pattern topologies;

performing first DRC processing on said initial layout pattern using said first critical design rules;

generating a reduced layout pattern by modifying said initial layout pattern to include only regions identified as satisfying at least one first critical design rule during said first DRC processing;

performing second DRC processing on said reduced layout pattern using said second critical design rules; and generating said corrected layout pattern data using results from said second DRC processing.

* * * * *